US012027801B2

(12) United States Patent
Yu

(10) Patent No.: US 12,027,801 B2
(45) Date of Patent: Jul. 2, 2024

(54) TREE POLE CONNECTORS

(71) Applicant: Ledup Manufacturing Group Limited, Irwindale, CA (US)

(72) Inventor: Jing Jing Yu, Irwindale, CA (US)

(73) Assignee: LEDup Manufacturing Group Limited, Irwindale, CA (US)

( * ) Notice: Subject to any disclaimer, the term of this patent is extended or adjusted under 35 U.S.C. 154(b) by 343 days.

(21) Appl. No.: 17/444,885

(22) Filed: Aug. 11, 2021

(65) Prior Publication Data

US 2022/0115815 A1 Apr. 14, 2022

Related U.S. Application Data

(60) Provisional application No. 63/091,047, filed on Oct. 13, 2020.

(51) Int. Cl.

| | |
|---|---|
| ***A47G 33/06*** | (2006.01) |
| ***A47G 33/08*** | (2006.01) |
| ***H01R 13/02*** | (2006.01) |
| ***H01R 13/645*** | (2006.01) |
| ***H01R 31/06*** | (2006.01) |
| ***H01R 43/26*** | (2006.01) |

(52) U.S. Cl.

CPC .......... *H01R 13/645* (2013.01); *A47G 33/06* (2013.01); *A47G 33/08* (2013.01); *H01R 13/02* (2013.01); *H01R 31/06* (2013.01); *H01R 43/26* (2013.01); *A47G 2033/0827* (2013.01)

(58) Field of Classification Search

CPC ...... H01R 13/645; H01R 13/02; H01R 43/26; A47G 33/06; A47G 33/08; A47G 2033/0827

See application file for complete search history.

(56) References Cited

U.S. PATENT DOCUMENTS

| | | | | |
|---|---|---|---|---|
| 2,135,267 A * | 11/1938 | Alden | H01J 5/50 | 439/379 |
| 7,062,870 B1 * | 6/2006 | You | D06F 75/34 | 38/88 |
| 7,390,225 B2 * | 6/2008 | Elku | H01J 5/56 | 439/220 |
| 7,604,505 B2 * | 10/2009 | Zayas | H01J 5/54 | 439/732 |
| 8,021,189 B2 * | 9/2011 | Zayas | H01R 33/965 | 439/617 |
| 8,167,654 B2 * | 5/2012 | Elku | A61L 2/08 | 439/617 |
| 8,465,321 B2 * | 6/2013 | Montena | H01R 9/0524 | 439/579 |
| 8,870,404 B1 * | 10/2014 | Chen | F21S 4/10 | 362/249.02 |
| 8,905,771 B2 * | 12/2014 | Tsai | A47G 33/06 | 439/214 |
| 9,179,793 B2 * | 11/2015 | Chen | A47G 33/08 | |

(Continued)

*Primary Examiner* — Thanh Tam T Le

(74) *Attorney, Agent, or Firm* — William W. Cochran; Cochran Freund & Young LLC

(57) ABSTRACT

Disclosed are embodiments for providing electrical connection between trunk sections of an artificial tree. In some embodiments, forces are created between electrical connectors on plugs and sockets to ensure a secure electrical connection. In other embodiments, pins and sockets are used in conjunction with rotational orientation devices to ensure proper orientations of the pins and sockets.

8 Claims, 31 Drawing Sheets

(56) References Cited

U.S. PATENT DOCUMENTS

| | | | | |
|---|---|---|---|---|
| 9,209,546 | B1 * | 12/2015 | Gibboney, Jr. | H01R 13/50 |
| 9,362,657 | B1 * | 6/2016 | Yang | F21S 4/10 |
| 9,431,765 | B2 * | 8/2016 | Tao | A47G 33/06 |
| 9,572,446 | B2 * | 2/2017 | Chen | A47G 33/06 |
| 9,593,831 | B2 | 3/2017 | Yu | |
| 9,671,074 | B2 * | 6/2017 | Chen | F21V 23/06 |
| 9,861,147 | B1 * | 1/2018 | Chen | H05B 45/00 |
| 9,894,949 | B1 * | 2/2018 | Chen | F21S 4/10 |
| 10,010,208 | B2 * | 7/2018 | Chen | F21S 4/10 |
| 10,264,907 | B2 * | 4/2019 | McRae | A47G 33/08 |
| 10,288,236 | B1 * | 5/2019 | Chen | F21S 4/26 |
| 10,305,238 | B2 * | 5/2019 | Ding | H01R 24/86 |
| 10,333,252 | B1 * | 6/2019 | Altamura | H01R 24/20 |
| 10,542,602 | B2 | 1/2020 | Yu | |
| 2005/0180163 | A1 * | 8/2005 | Huang | G02B 6/0008 362/568 |
| 2014/0268689 | A1 * | 9/2014 | Chen | H01R 33/92 29/876 |
| 2020/0037802 | A1 * | 2/2020 | Zhou | H01R 24/84 |
| 2022/0181829 | A1 * | 6/2022 | Ocegueda Gallaga | A47G 33/06 |

* cited by examiner

TREE POLE CONNECTORS

CROSS-REFERENCE TO RELATED APPLICATION

This Non provisional patent application claims the benefit of the Provisional Patent Application No. 63/091,047, entitled "Tree Pole Connectors," which was filed with the US. Patent & Trademark Office on Oct. 13, 2020, which is specifically incorporated herein by reference for all that it discloses and teaches.

BACKGROUND

Artificial trees have become popular especially as pre-lit Christmas trees because of their convenience and their ever-increasing aesthetics. In addition, improvements in manufacturing and automated assembly procedures have caused the cost of the artificial trees to decrease over time. As a result, artificial pre-lit Christmas trees have become more and more popular in cultures that celebrate Christmas.

SUMMARY

The present invention may therefore comprise a system for connecting electrical signals between a plurality of trunk sections of an artificial tree comprising: a first trunk section of the plurality of trunk sections of the artificial tree; a second trunk section of the plurality of trunk sections of the artificial tree that connects to the first trunk section; a plug having either a plug interior wall portion or a plug exterior wall portion, and plug inclined surfaces; a socket that has either a socket interior wall portion or a socket exterior wall portion, and socket inclined surfaces that have an inclination and a shape that match the plug inclined surfaces so that the plug inclined surfaces engage and slide along the socket inclined surfaces during assembly of the socket and the plug when the first trunk section connects to the second trunk section so that the plug and the socket are aligned; plug contacts mounted on either the plug interior wall portion or the plug exterior wall portion; socket contacts mounted on the socket interior wall portion when the plug contacts are mounted on the plug exterior wall portion, or the socket exterior wall portion when the plug contacts are mounted on the plug interior wall portion, so that the socket contacts engage and are aligned with the plug contacts when the plug and the socket are assembled and generate a generally radial force between the plug contacts and the socket contacts as a result of the plug contacts engaging the socket contacts when the plug and the socket are assembled.

The present invention may further comprise a method of connecting electrical signals between a plurality of trunk sections of a tree trunk for an artificial tree comprising: providing a plug having plug inclined surfaces and plug contacts located on either an interior wall portion or an exterior wall portion of the plug; providing a socket having socket inclined surfaces that mate with the plug inclined surfaces and socket contacts located on either an exterior wall portion or an interior wall portion of the socket that are disposed in a position that is opposite to the plug contacts when the plug is engaged with the socket; mounting the plug on a first trunk section of the plurality of trunk sections of the tree trunk; mounting the socket on a second trunk section of the plurality of trunk sections of the tree trunk; assembling the first trunk section and the second trunk section by inserting a reduced diameter portion of the first trunk section or the second trunk section into a non-reduced diameter portion of the first trunk section or the second trunk section; pushing the first trunk section and the second trunk section together which causes the plug inclined surfaces and the socket inclined surfaces to slide together to align the plug and the socket along an axis of the first trunk section and the second trunk section when the first trunk section and the second trunk section are assembled, which creates radial forces between the plug contacts and the socket contacts and establishes solid electrical connections between the Plug contacts and the socket contacts.

The present invention may further comprise a system for connecting electrical signals between a plurality of trunk sections of an artificial tree comprising: a first trunk section of the plurality of trunk sections of the artificial tree; a second trunk section of the plurality of trunk sections of the artificial tree that connects to the first trunk section; a plug disposed in and secured to an interior portion of the first trunk section, the plug having plug inclined surfaces; a socket disposed in and secured to an interior portion of the second trunk section, the socket having socket inclined surfaces that have an inclination and shape that match the plug inclined surfaces, the plug inclined surfaces and the socket inclined surfaces causing the plug and the socket to align during assembly of the plug and the socket; plug contacts located on one half of a central portion of the plug facing an open section of the plug; socket contacts located on one half of a central portion of the socket facing an open section of the socket so that the socket contacts engage and are aligned with the plug contacts when the plug and the socket are assembled, the plug contacts extending from the central portion of the plug and the socket contacts extending from the central portion of the socket sufficiently to cause the plug contacts and the socket contacts to compress and create a force between the plug contacts and the socket contacts that provides a solid and stable electrical connection between the plug contacts and the socket contacts.

The present invention may further comprise a method of connecting electrical signals between a plurality of trunk sections of a trunk of an artificial tree comprising: providing a plug having plug inclined surfaces and plug contacts centrally located in said plug; providing a socket having socket inclined surfaces and socket contacts that are centrally located in said socket; mounting said plug in a hollow interior portion of a first trunk section of said plurality of trunk sections of said tree trunk; mounting said socket in a hollow interior portion of a second trunk section of said plurality of trunk sections of said tree trunk; assembling said first trunk section and said section trunk section by inserting a reduced diameter portion of said first trunk section or said second trunk section into a non-reduced diameter portion of said second trunk section or said first trunk section; pushing said first trunk section and said second trunk section together, which causes said plug inclined surfaces and said socket inclined surfaces to slide together to align said plug and said socket along an axis of said first trunk section and said second trunk section when said first trunk section and said second trunk section are assembled, which creates opposing forces between said plug contacts and said socket contacts.

The present invention may further comprise a system for connecting electrical signals between a plurality of trunk sections of an artificial tree comprising: a first trunk section of the plurality of trunk sections of the artificial tree; a second trunk section of the plurality of trunk sections of the artificial tree that connects to the first trunk section; a plug having a plug cylindrical housing; a plug curved guide sheath attached to the plug cylindrical housing, the plug curved guide sheath having plug rotational alignment surfaces that extend from the plug cylindrical housing by a first predetermined amount; a socket having a socket cylindrical housing; a socket curved guide sheath attached to the socket cylindrical housing, the socket curved guide sheath having socket rotational alignment surfaces that extend from the socket cylindrical housing by a second predetermined amount and that abut against the plug rotational alignment surfaces to rotationally align the plug and the socket; socket connector receptacles disposed in the socket cylindrical housing; plug connector pins disposed on the plug cylindrical housing and extend from the plug cylindrical housing by an amount that is less than the first predetermined amount and the second predetermined amount so that the plug connector pins are aligned with the socket connector receptacles prior to the plug connector pins touching the socket cylindrical housing.

The present invention may further comprise a method of connecting electrical signals between a plurality of trunk sections of a trunk of an artificial tree comprising: providing a plug having a plug curved guide sheath, a plug cylindrical housing, that supports plug connector pins, and a plug collar; providing a socket having a socket curved guide sheath, a socket cylindrical housing, that supports socket connector receptacles, and a socket collar; mounting the plug on a first trunk section of the plurality of trunk sections; mounting the socket on a second trunk section of the plurality of trunk sections; inserting a reduced diameter portion of the first trunk section or the second trunk section into a non-reduced diameter portion of the second trunk section or the first trunk section; aligning the plug and the socket by rotating the plug and the first trunk section, or the socket and the second trunk section, or both, until the plug curved guide sheath is aligned with a socket cylindrical housing and a socket curved guide sheath is aligned with a plug cylindrical housing, and plug rotational alignment surfaces abut socket rotational alignment surfaces so that plug connector pins are aligned with socket connector receptacles; assembling the first trunk section and the second trunk section after the plug and the socket are aligned so that the plug connector pins are inserted into the socket connector receptacles to form electrical connections.

The present invention may further comprise a system for connecting electrical signals between a plurality of trunk sections of an artificial tree comprising: a first trunk section of the plurality of trunk sections of the artificial tree; a second trunk section of the plurality of trunk sections of the artificial tree that connects to the first trunk section; a plug disposed in and secured to an interior portion of the first trunk section, the plug having a plug connection post and plug rotational alignment surfaces formed in a plug housing; a socket disposed in and secured to an interior portion of the second trunk section, the socket having a socket connection post and socket rotational alignment surfaces that abut against the plug rotational alignment surfaces that align the plug and the socket when the plug and the socket are assembled; socket connector receptacles disposed in the socket connection post; plug connector pins disposed on the plug connection post that extend from the plug connection post by an amount that is less that the plug rotational alignment surfaces and the socket rotational alignment surfaces so that the plug connector pins are aligned with the socket connector receptacles prior to the plug connector pins touching the socket connection post.

The present invention may further comprise a method of connecting electrical signals between a plurality of trunk sections of a tree trunk of a pre-lit artificial tree comprising: providing a plug having a plug connection post that supports plug connector pins and a plug wall guide that extends from the plug connection post; providing a socket having a socket connection post that supports socket connector receptacles and a socket wall guide that extends from the socket connection post; mounting the plug in a hollow interior portion of a first trunk section of the plurality of trunk sections; mounting the socket in a hollow interior portion of a second trunk section of the plurality of trunk sections; inserting a reduced diameter portion of the first trunk section or the second trunk section into a non-reduced diameter portion of the second trunk section or the first trunk section; aligning the plug and the socket by rotating the plug and the first trunk section, or the socket and the second trunk section, or both, until a plug wall guide is aligned with a socket connection post and a socket wall guide is aligned with a plug connection post and plug rotational alignment surfaces abut socket rotational alignment surfaces so that plug connector pins are aligned with socket connector receptacles; assembling the first trunk section and the second trunk section after the plug and the socket are aligned so that the plug connector pins are inserted into the socket connector receptacles to form an electrical connection.

DETAILED DESCRIPTION OF THE EMBODIMENTS

Figure 1:
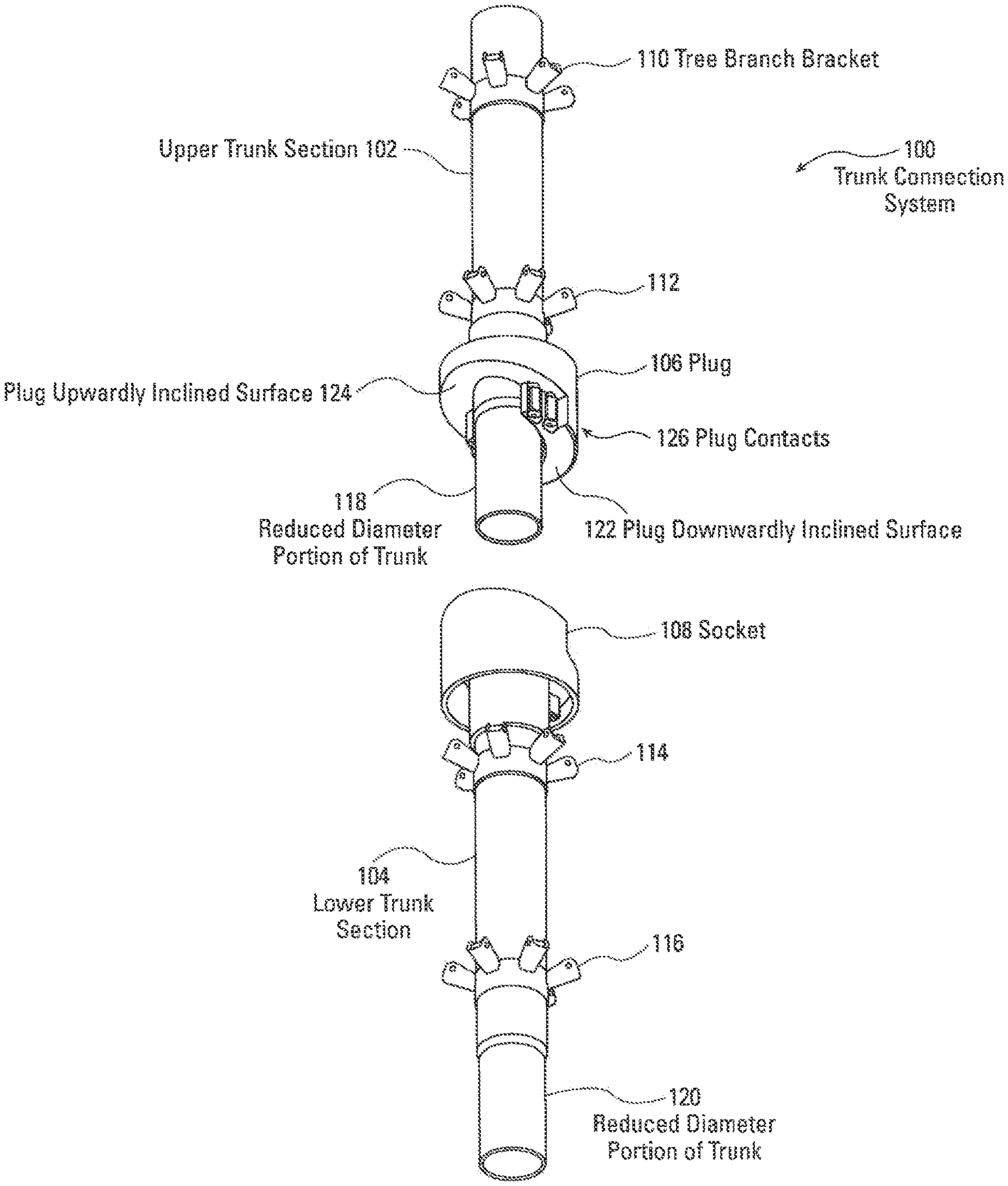
FIG. 1 is a perspective view of one embodiment of a tree trunk connector system.

FIG. 1 is a perspective view of and embodiment of a trunk connection system 100 of the present invention. As illustrated in FIG. 1, the think connection system 100 connects a plurality of trunk sections, such as an upper trunk section 102 and a lower trunk section 104 for the transmission of electrical signals. The electrical signals may comprise power signals, and/or communication signals and/or control signals. Of course, additional trunk sections can be used and connected in the manner shown. In this case, a plurality of trunk sections means more than one trunk section. FIG. 1 is an assembly view illustrating the manner in which the upper trunk section 102 can be assembled with the lower trunk segment 104. The upper trunk section 102 has a plug 106 that plugs into a socket 108 that is connected to the lower trunk section 104. The plug 106 is connected to the upper trunk section 102 by any desired means, such as adhesives, bonding agents, set pins, bolts or other desired means known in the art. Similarly, socket 108 is connected to the lower trunk section 104 in any desired manner. A series of tree branch brackets 110-116 are spaced out along the length of the upper trunk section 102 and lower trunk section 104. The tree branch brackets 110-116 hold artificial tree branches for a pre-lit Christmas tree. The artificial branches typically have LED lights on the branches. Power and communications for the lights is transmitted through the interior portion of the trunk sections 102, 104 to connectors (not shown) on the trunk sections 102, 104. The LED lights can be controlled by communication signals transmitted to the tree as disclosed in U.S. Pat. No. 10,542,602, issued Jan. 21, 2020 to Yu, entitled "Individually Accessible LED Light System," and U.S. Pat. No. 9,593,831, issued Mar. 14, 2017 to Yu, entitled "Artificial LED Lighted Christmas Tree," which are specifically incorporated herein by reference for all that they disclose and teach. The upper trunk section 102 has a reduced diameter portion 118 that slides into and fits an upper portion of the lower trunk section 104. The lower trunk section 104 has a reduced diameter portion 120 that can slide into another trunk section or a base that holds the tree. Plug 106 has a plug upwardly inclined surface 124 and a plug downwardly inclined surface 122. Plug 106 also includes plug contacts 126. Socket 108 fits into plug 106 as described below.

Figure 2:
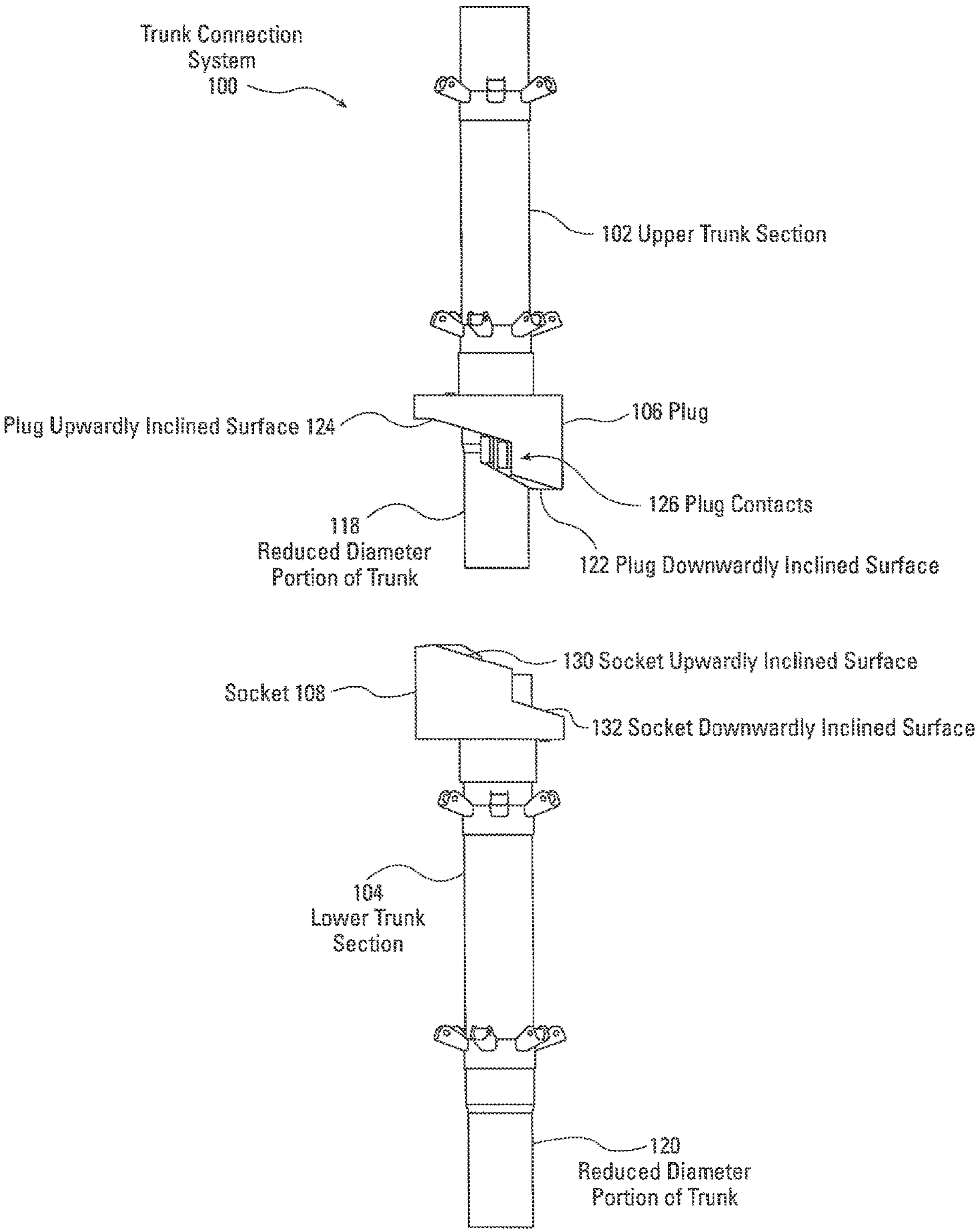
FIG. 2 is a side view of the embodiment of FIG. 1.

FIG. 2 is a side view of the trunk connection system 100 of FIG. 1. As illustrated in FIG. 2, the trunk connection system has an upper trunk section 102 and a lower trunk section 104. Plug 106 has a plug upwardly inclined surface 124 and a plug downwardly inclined surface 122. Plug contacts 126 of plug 106 are mounted on an interior wall portion of the plug 106. Upper trunk section 102 has a reduced diameter portion 118 that allows the upper trunk section 102 to be fit into the lower trunk section 104. Socket 108 has a socket upwardly inclined surface 130 and a socket downwardly inclined surface 132. The socket upwardly inclined surface 130 matches the plug upwardly inclined surface 124 of plug 106. Similarly, the socket downwardly inclined surface 132 of socket 108 matches the plug downwardly inclined surface 122 of plug 106, When the upper trunk section 102 is fit into the lower trunk section 104, the plug 106 fits into the socket 108 and the trunk sections 102, 104 rotate until the plug 106 fits into the socket 108. The socket upwardly inclined surface 130 of the socket 108 fits tightly against the plug upwardly inclined surface 124 of the plug 106. Similarly, the socket downwardly inclined surface 132 fits tightly against the plug downwardly inclined surface 122. The tight fit between the plug 106 and the socket 108 allows for secure connections between contacts in the plug 106 and the socket 108. Lower trunk section 104 has a reduced diameter portion 120 that can fit into another trunk section or into a base.

Figure 3:
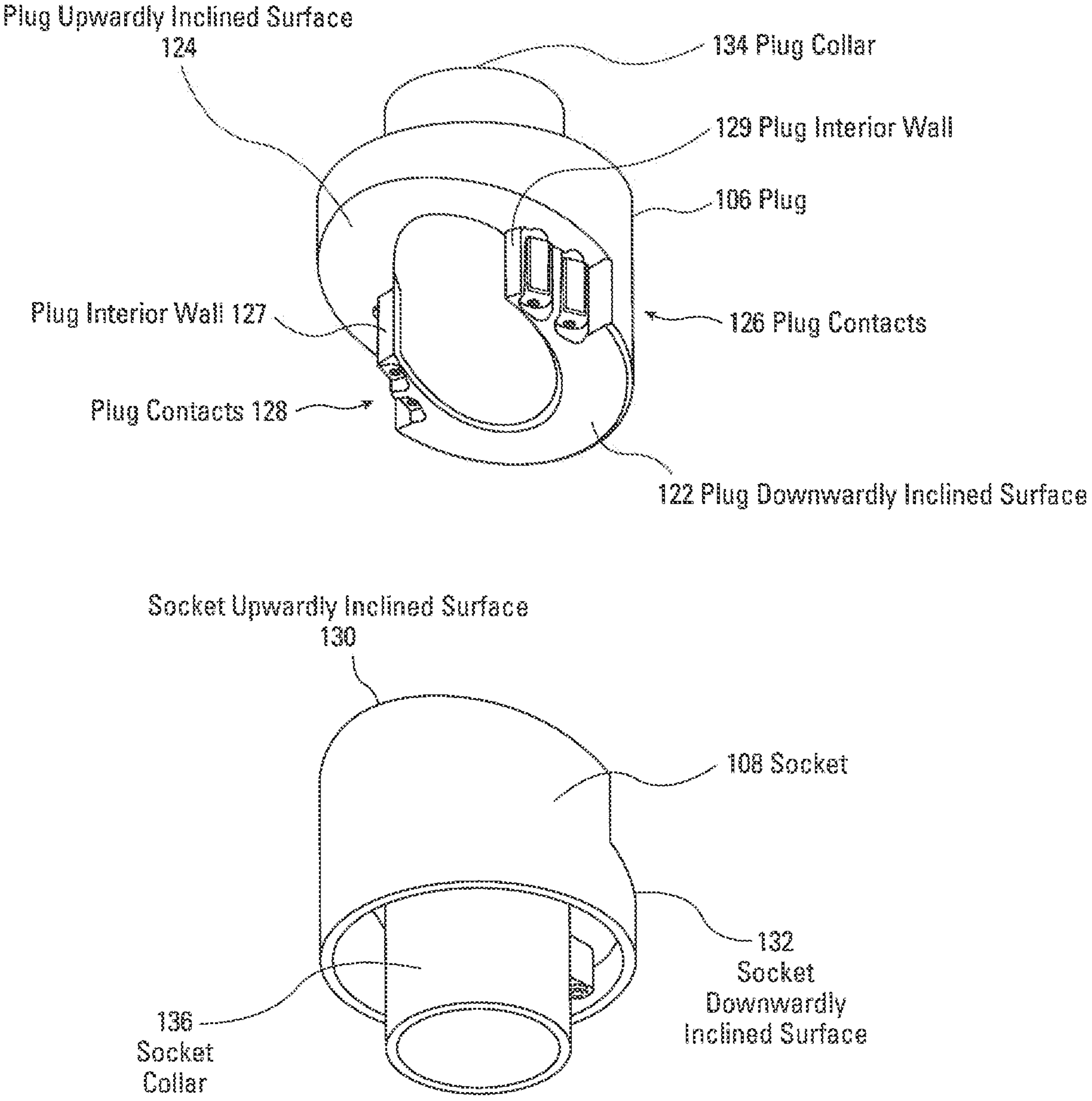
FIG. 3 is a close-up view of the plug and socket portions of the embodiments of FIGS. 1 and 2.

FIG. 3 is a close-up exploded assembly view of the plug 106 and the socket 108. The plug downwardly inclined surface 122 engages the socket downwardly inclined surface 132 and the socket upwardly inclined surface 130 engages the plug upwardly inclined surface 124 to rotationally align the plug 106 and the socket 108 prior to engagement of plug contacts 126 and plug contacts 128 with similar contacts located in the socket 108, In this manner, the plug contacts 126, 128 can slidingly engage the socket contacts in the socket 108 with a proper rotational alignment configuration. Plug contacts 128 and plug interior wall 129 support plug contacts 126 in a generally radial direction. In other words, the plug contacts 128 and plug contacts 126 face in a generally outward direction from the center of the plug 106.

Figure 4:
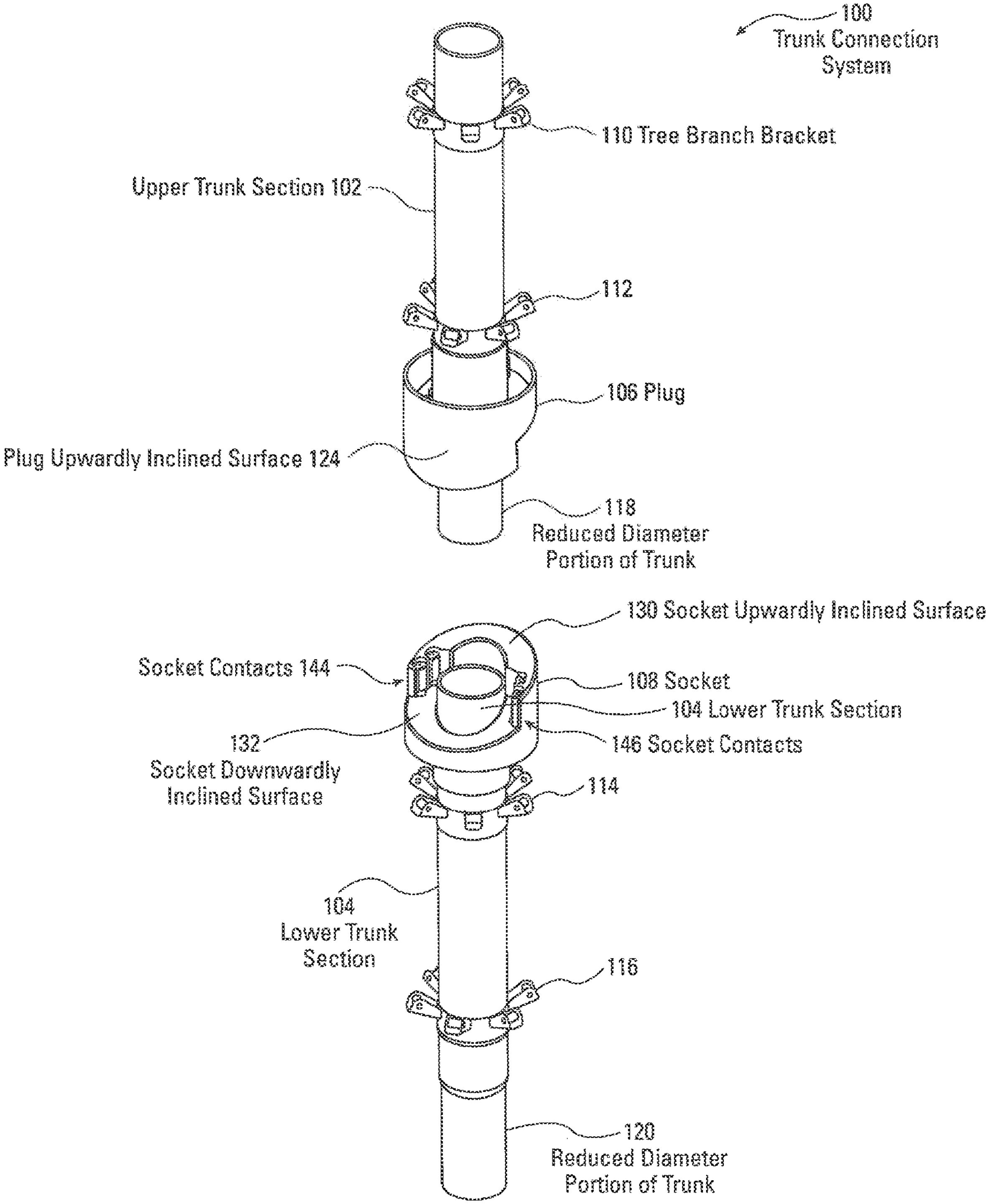
FIG. 4 is a perspective view of the embodiment of FIG. 1.
Figure 5:
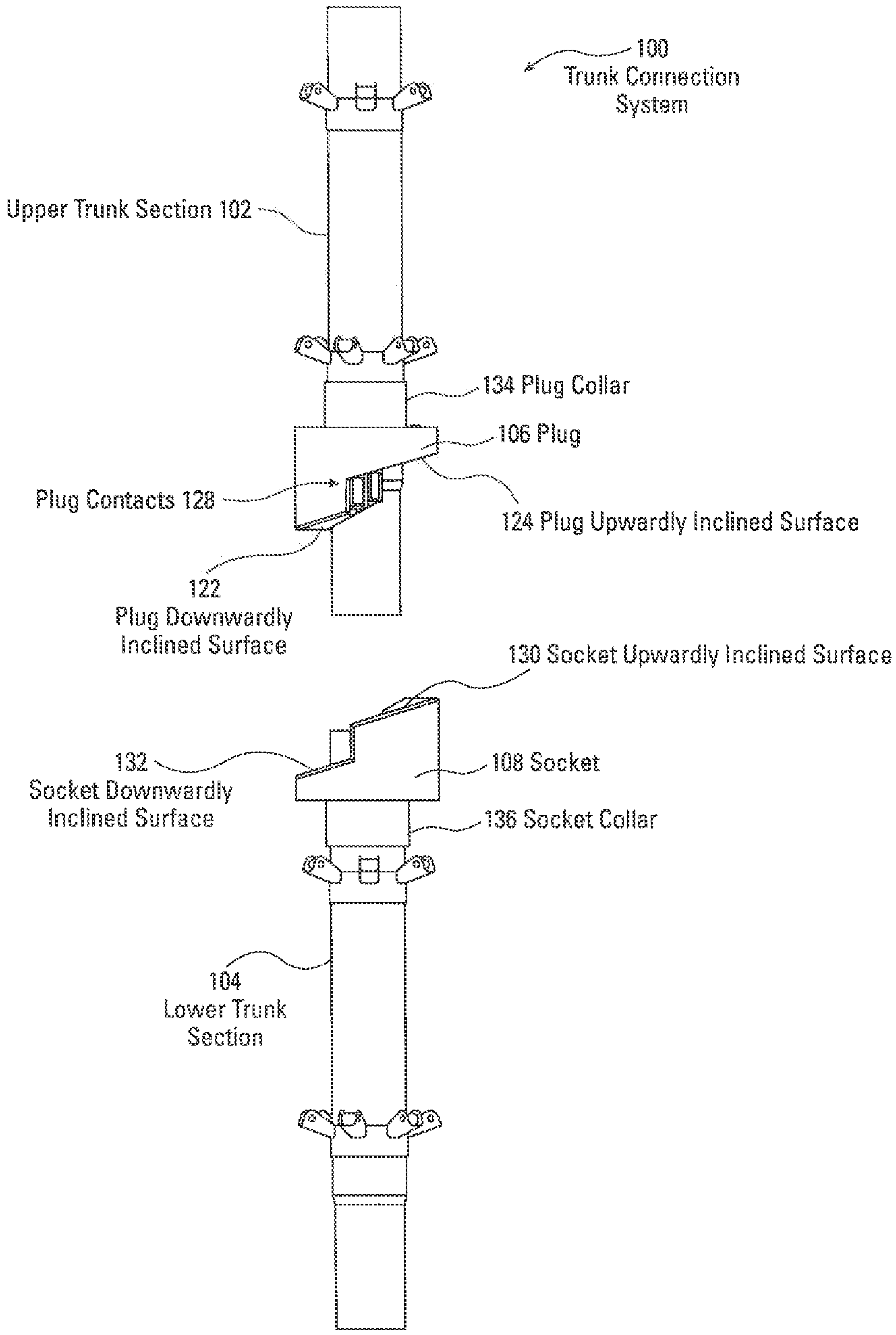
FIG. 5 is another side view of the embodiment of FIG. 1.

FIG. 4 is perspective assembly view of the trunk connection system 100 from a different perspective than shown in FIG. 1. As illustrated in FIG. 4, the trunk connection system 100 includes an upper trunk section 102 and a lower trunk section 104. Tree branch brackets 110-116 are connected to the trunk sections 102, 104 and are spaced out along the length of trunk sections 102, 104. Plug 106 is connected to the upper trunk section 102 and engages the socket 108 when the reduced diameter portion of the trunk 118 is inserted into the socket cylindrical section 131 of the socket 108. The plug 106 becomes aligned with the socket 108 as a result of the socket upwardly inclined surface 130 and the socket downwardly inclined surface 132 that engage the plug upwardly inclined surface 124 and plug downwardly inclined surface 122, respectively as shown in FIG. 3. When the plug 106 is aligned with the socket 108, the contacts plug 126, 128 (FIG. 3) can slidingly engage socket contacts 146, 144, respectively. Reduced diameter portion 120 of the lower trunk section 104 can engage an additional trunk section or a base that holds the tree, FIG. 5 is a side view of the trunk connection system 100. As illustrated in FIG. 5, plug 106 is connected to the upper trunk section 102. Socket 108 is connected to lower trunk section 104. As can be seen in FIG. 5, the plug downwardly inclined surface 122 matches the slope on the socket downwardly inclined surface 132 of socket 108. Similarly, the plug upwardly inclined surface 124 of plug 106 matches the socket upwardly inclined surface 130 of socket 108. As such, the plug 106 can fit tightly against the socket 108 when assembled.

Figure 6:
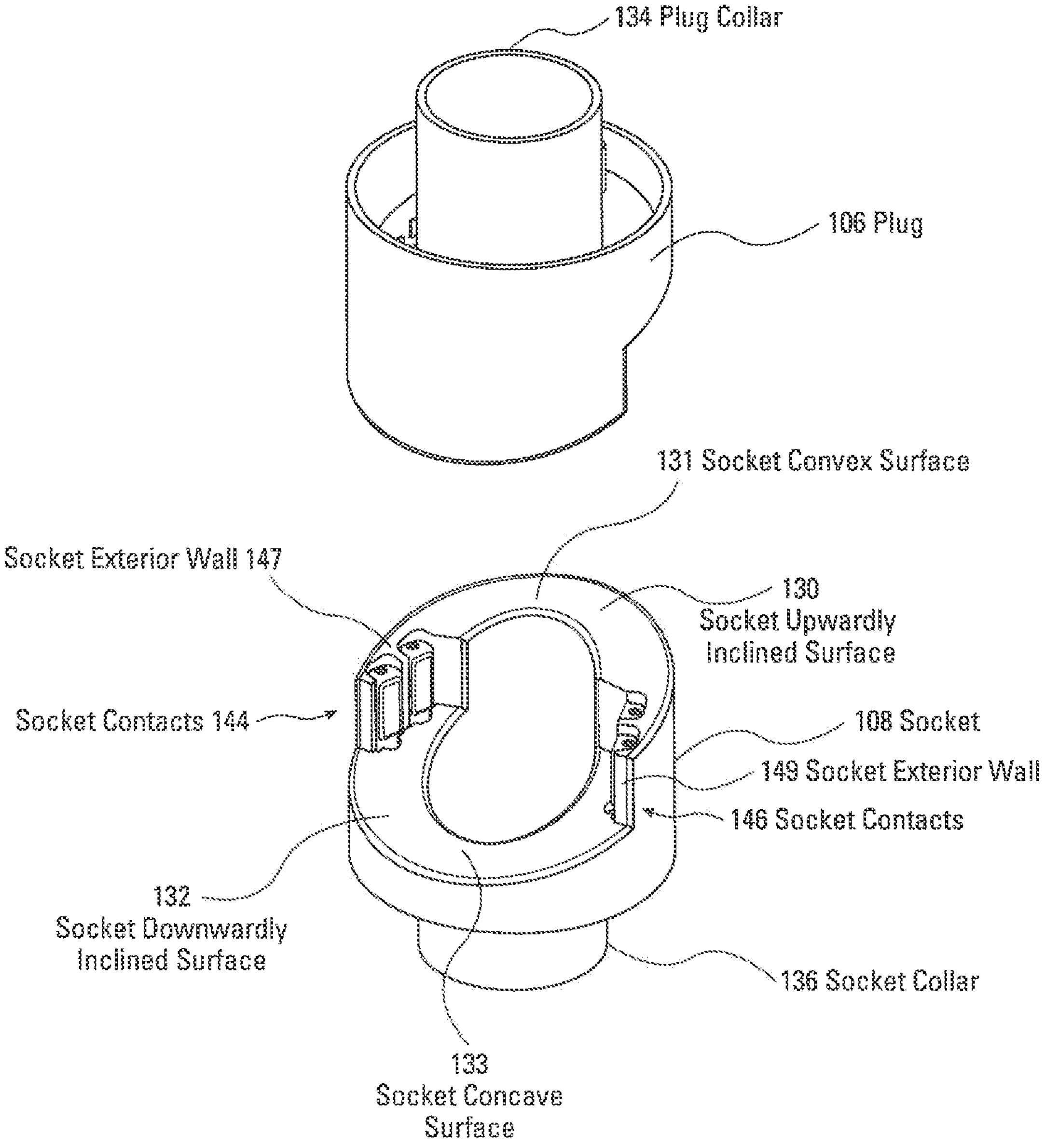
FIG. 6 is a perspective close-up view of the plug and socket.

FIG. 6 is a close-up view of plug 106 and socket 108. As illustrated in FIG. 6, socket 108 has a socket upwardly inclined surface 130 and a socket downwardly inclined surface 132. The socket upwardly inclined surface 130 may also include a socket convex surface 131 that constitutes a protrusion from the socket upwardly inclined surface 130, Similarly, socket downwardly inclined surface 132 may include a socket concave surface 133. Plug 106 has matching surfaces, as disclosed below. Socket contacts 144, 146 are also illustrated as being mounted on an exterior housing portion of the socket 108. When the plug 106 and the socket 108 are mounted on trunk portions 102, 104, respectively, the reduced diameter portion 118 fits into the normal diameter (non-reduced) portion of the lower trunk 104. This causes the trunk portions 102, 104, to align so that the plug 106 and socket 108 are centered on the upper trunk section 102 and lower trunk section 104, respectively. Socket exterior wall 147 supports the socket contacts 144 so that the socket contacts 144 face inwardly towards the center of the socket 108 in a generally radial direction. Similarly, socket exterior wall 149 supports the socket contacts 146 so that the socket contacts 146 face in a generally inward direction toward the center of socket 108 in a generally radial direction in that regard, the term "generally radial direction" means that socket contacts 144 and the socket contacts 146 are facing inwardly towards an inward portion of the socket 108 so that a right angle projection from the face of the socket contacts 144, 146 is less than ninety degrees from a radial line projected from the center of the socket 108 through the face of each of the socket contacts 144, 146. The socket exterior walls 147, 149, as well as the plug interior walls 127, 129, provide radial support for the socket contacts 144, 146 and plug contacts 128, 126, respectively, as shown in FIGS. 3 and 6. The plug contacts 128, 126 and/or the socket contacts 144, 146 may be mounted on the plug interior walls 127, 129 and socket exterior walls 147, 149, respectively, so that the plug contacts 128, 126 and/or the socket contacts 144, 146 protrude slightly so that upon assembly, there is a friction fit between the plug contacts 128, plug contacts 126 and socket contacts 144, socket contacts 146 to create a solid and reliable electrical connection in that regard, the plug contacts 128, 126 and socket contacts 144, 146 may have elasticity so that the plug contacts 128, 126 and socket contacts 144, 146 deflect slightly and create a generally radial force between the plug contacts 128, 126 and socket contacts 144, 146, Alternatively or in addition to providing plug contacts and socket contacts with the ability to deflect, the plug interior walls 127, 129 and socket exterior walls 147, 149 may also be constructed to have a slight amount of deflection and elasticity to create a generally radial force between plug contacts 128, 126 and socket contacts 144, 1.46.

Figure 7:
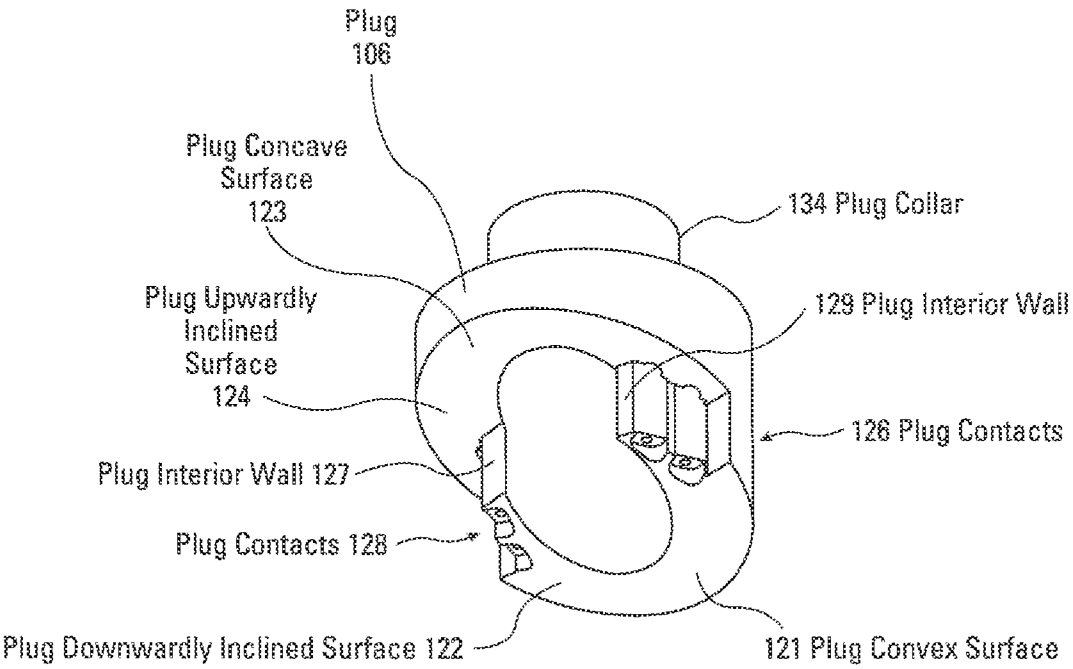
FIG. 7 is an enlarged view of the plug of the embodiment of FIG. 1.

FIG. 7 is an expanded view of the plug 106. Plug 106 has a plug upwardly inclined surface 124 and plug downwardly inclined surface 122. Plug 106 has a plug convex surface 121 on the plug downwardly inclined surface 122 and a plug concave surface on the plug upwardly inclined surface 124. The convexity of plug convex surface 121 matches the concavity of socket concave surface 133 of socket 108. Similarly, the concavity of plug concave surface 123 matches the convexity of socket convex surface 131 of socket 108. The concave and convex surfaces of the plug 106 and socket 108 function to lock together the plug 106 and socket 108 when assembled. The inclined surfaces 122, 124 of plug 106 and inclined surfaces 130, 132 of socket 108 align the plug 106 and socket 108 in an axial direction, which generates a generally radial force. In addition, a generally radial force is created by the reduced diameter portion 118 of upper trunk section 102 when inserted into the upper opening of the lower trunk section 104. These generally radial forces cause the plug contacts 128, 126 to be forced against socket contacts 144, 146, respectively. Plug contacts 126, 128 are mounted on plug interior walls 129, 127, respectively, of the plug 106. The contacts 126, 128, 144, 146 are made to flex slightly so that the generally radial forces cause the contacts to flex and to be under constant pressure to create a solid and reliable electrical connection between the contacts. In other words, the generally radial forces of the trunk sections as well as the generally radial forces created by the sloped surfaces 122, 124 of plug 106 and 130, 132 of socket 108 function together to cause the plug 106 and socket 108 to move together in an inward radial direction. The concave and convex surfaces that are located on the sloped surfaces of the plug 106 and socket 108 function to lock the plug 106 and the socket 108 together to ensure that the forces created in a radial inward direction between the plug 106 and the socket 108 are maintained under varying conditions. The concave and convex surfaces also create radial inward forces. In that regard, the term "generally radial force" means that the plug contacts 126, 128 face outwardly towards an exterior portion of the plug 106 so that a right angle projection from the face of the plug contacts 126, 128 is less than ninety degrees from a radial line projected from the center of the plug 106 through the face of each of the plug contacts 126, 128.

Figure 8:
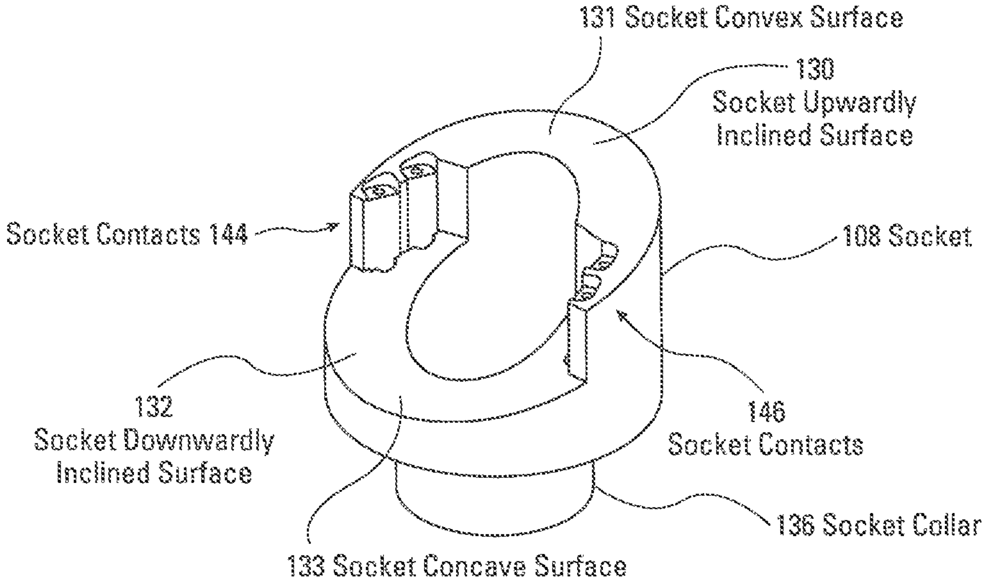
FIG. 8 is an enlarges perspective view of the socket of the embodiment of FIG. 1.

FIG. 8 is an expanded perspective view of the socket 108. As illustrated in FIG. 8, socket 108 has a socket upwardly inclined surface 130 and a socket downwardly inclined surface 132. Socket contacts 144, 146 are mounted on an exterior cylindrical surface of the socket 108 so that socket contacts 144, 146 connect with plug contacts 128, 126 respectively in a substantially radial direction of the plug 106 and socket 108. The forces created by plug interior walls 129, 126 in a radial direction as a result of the plug contacts 126, 128 pushing on socket contacts 146, 148, create a solid and reliable electrical connection between the contacts. Again, the socket convex surface 131 engages the plug concave surface 123, while socket concave surface 133 engages the plug convex surface 122 which function to lock the plug 106 and the socket 108 together when assembled.

Figure 9:
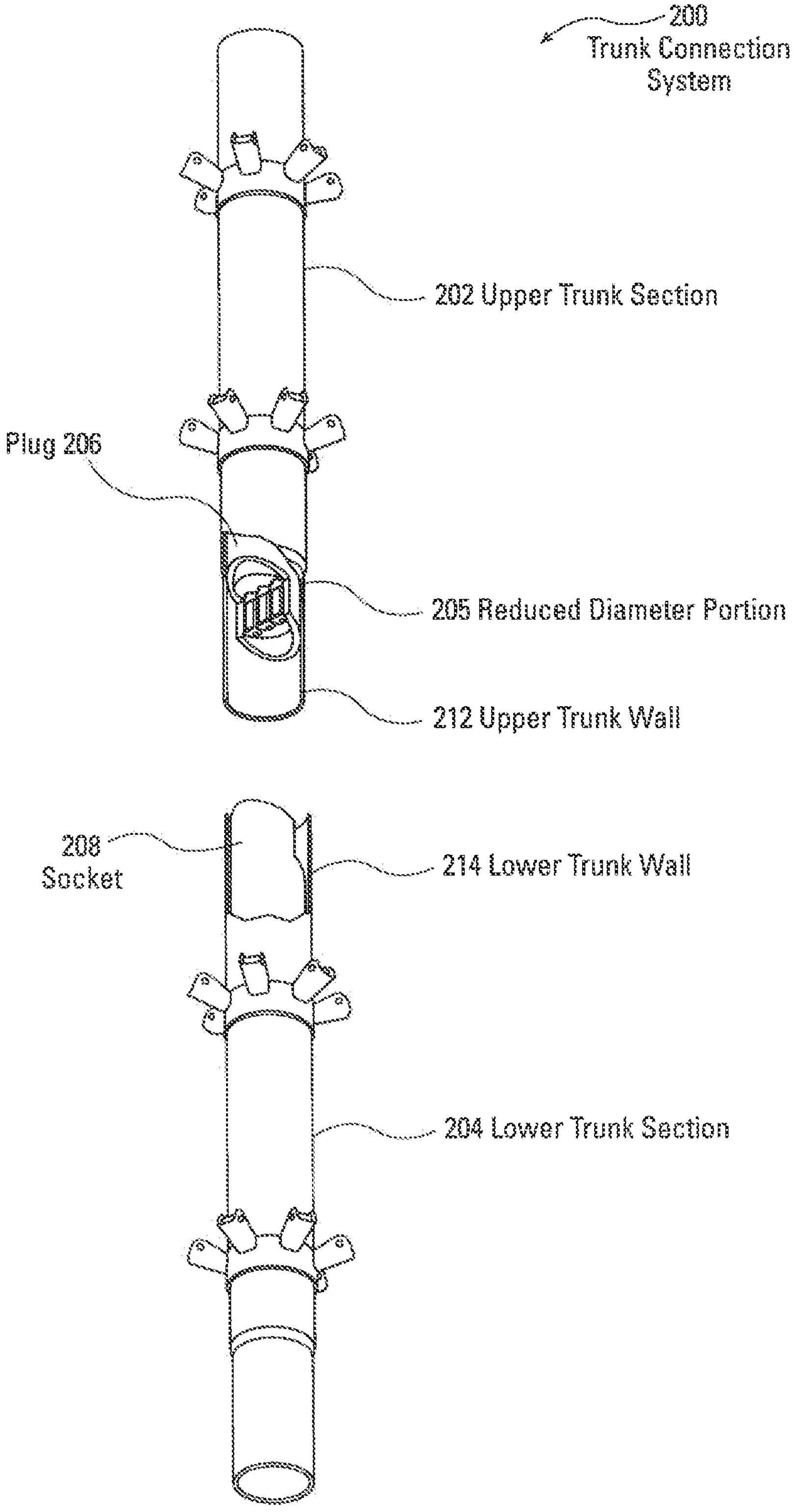
FIG. 9 is a perspective view of another embodiment of a trunk connection system.

FIG. 9 is another embodiment of a trunk connection system 200. As illustrated in FIG. 9, an upper trunk section 202 mates with a lower trunk section 204, Plug 206 is mounted inside the hollow portion of the upper trunk section 202. Plug 206 can be mounted in the inner portion of the upper trunk section 202 by any desired means, including friction fit, inset screws extending through the upper trunk wall 212, bonding materials or other methods known to those skilled in the art, Lower trunk section 204 includes a socket 208 that is mounted in the interior portion of the lower trunk section 204, Again, the socket 208 can be mounted to the lower trunk wall 214 by any desired means including bonding, adhesives, friction fit, snap fit or other means known by those skilled in the art. The cut-away portion illustrates the plug 206 is mounted in the hollow interior portion of the upper trunk section. The upper trunk wall 212 is shown in the cut-away portion. Further, the lower trunk wall 214 is illustrated in the cut-away section of the lower trunk section 204.

Figure 10:
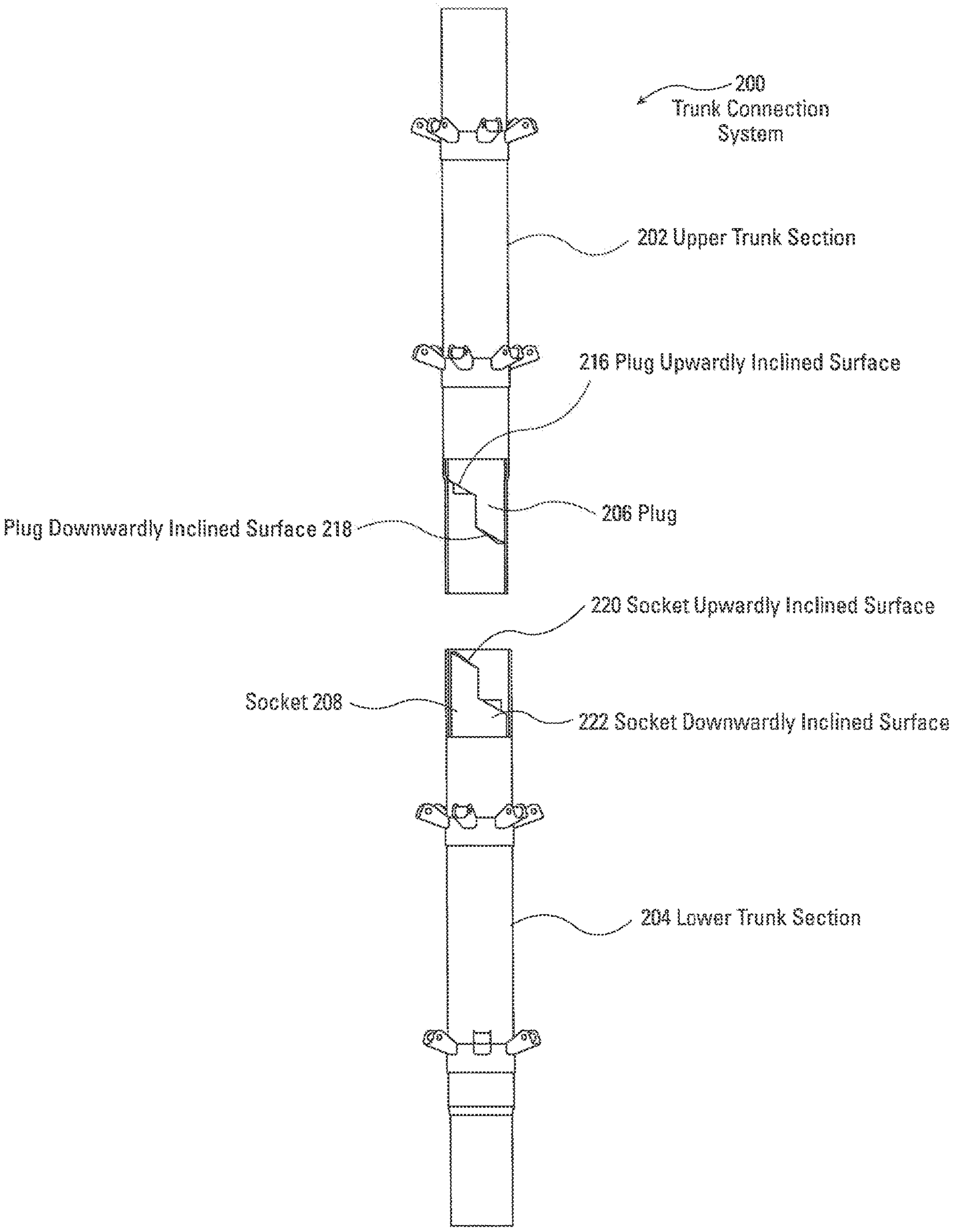
FIG. 10 is a side view of the embodiment of FIG. 9.

FIG. 10 is a side view of the embodiment of FIG. 9 of the trunk connection system 200, As illustrated in Flare 10, the trunk connection system 200 illustrates plug 206 disposed in the upper trunk section 202. Similarly, socket 208 is disposed in the lower trunk section 204. Plug 206 has a plug upwardly inclined surface 216 and a plug downwardly inclined surface 218, Similarly, socket 208 has a socket upwardly inclined surface 220 and a socket downwardly inclined surface 222. As can be seen from FIG. 10, the slope of the inclined surfaces of the plug 206 match the slop of the inclined surfaces of the socket 208.

Figure 11:
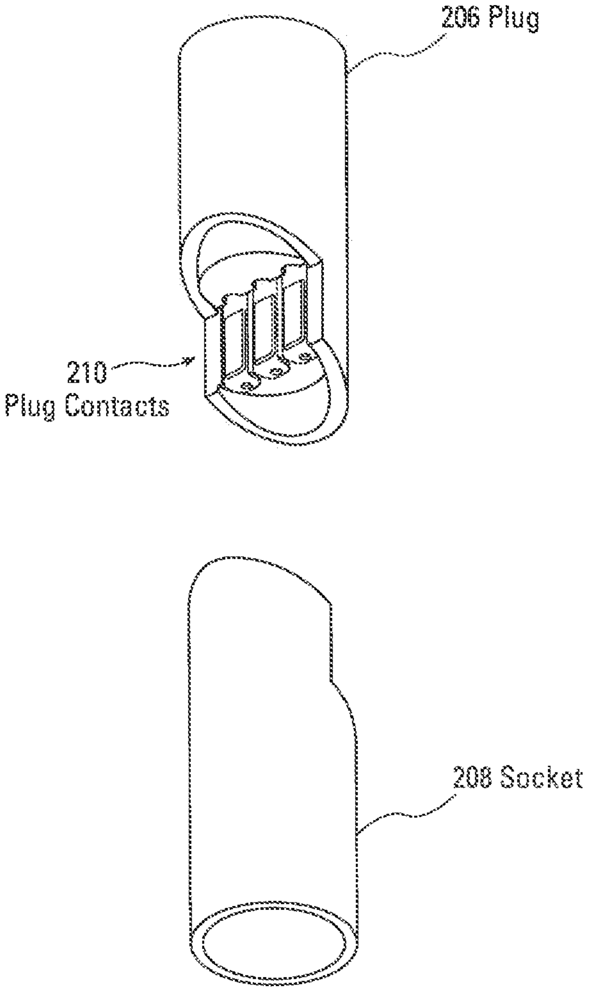
FIG. 11 is a perspective assembly view of the plug and socket of FIG. 9.
Figure 12:
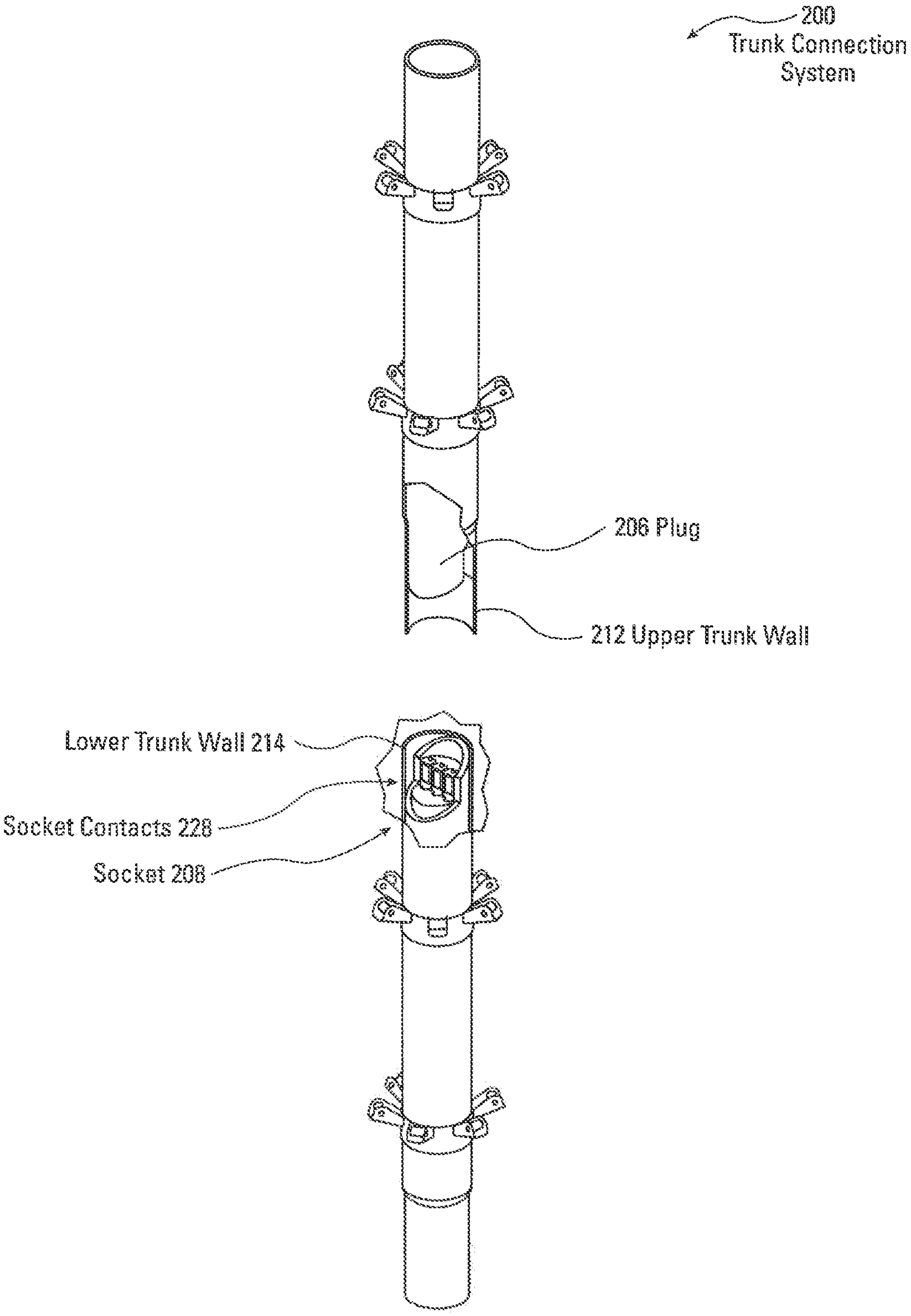
FIG. 12 is another perspective view of the trunk connection system of the embodiment of FIG. 9 from a different perspective.

FIG. 11 is an exploded assembly view of plug 206 and socket 208, illustrating the manner in which, the plug and the socket are assembled. As also illustrated in FIG. 11, the plug contacts 210 are mounted on one half of a central portion of the plug 206. In other words, the plug contacts 210 are mounted on one half of the plug 206 facing the other half of the socket 208 which contains socket contacts as disclosed below, FIG. 12 is another perspective view of the trunk connection system 200 from a different perspective, which illustrates the socket contacts 228 of socket 208, As illustrated in FIG. 12, the socket contacts 228 are disposed on one half of the socket facing an empty half of the socket that is filled by the plug 206. The cut-away sections also illustrate the upper trunk wall 212 in which the plug 206 is mounted and the lower trunk wall 214 in which the socket 208 is mounted. Again, both the plug 206 and the socket 208 can be mounted in any standard fashion, including friction fit, adhesives, bonding agents, bonding techniques or physically attached using screws. Of course, any desired method of mounting the plug 206 and socket 208 can be used that are known by those skilled in the art.

Figure 13:
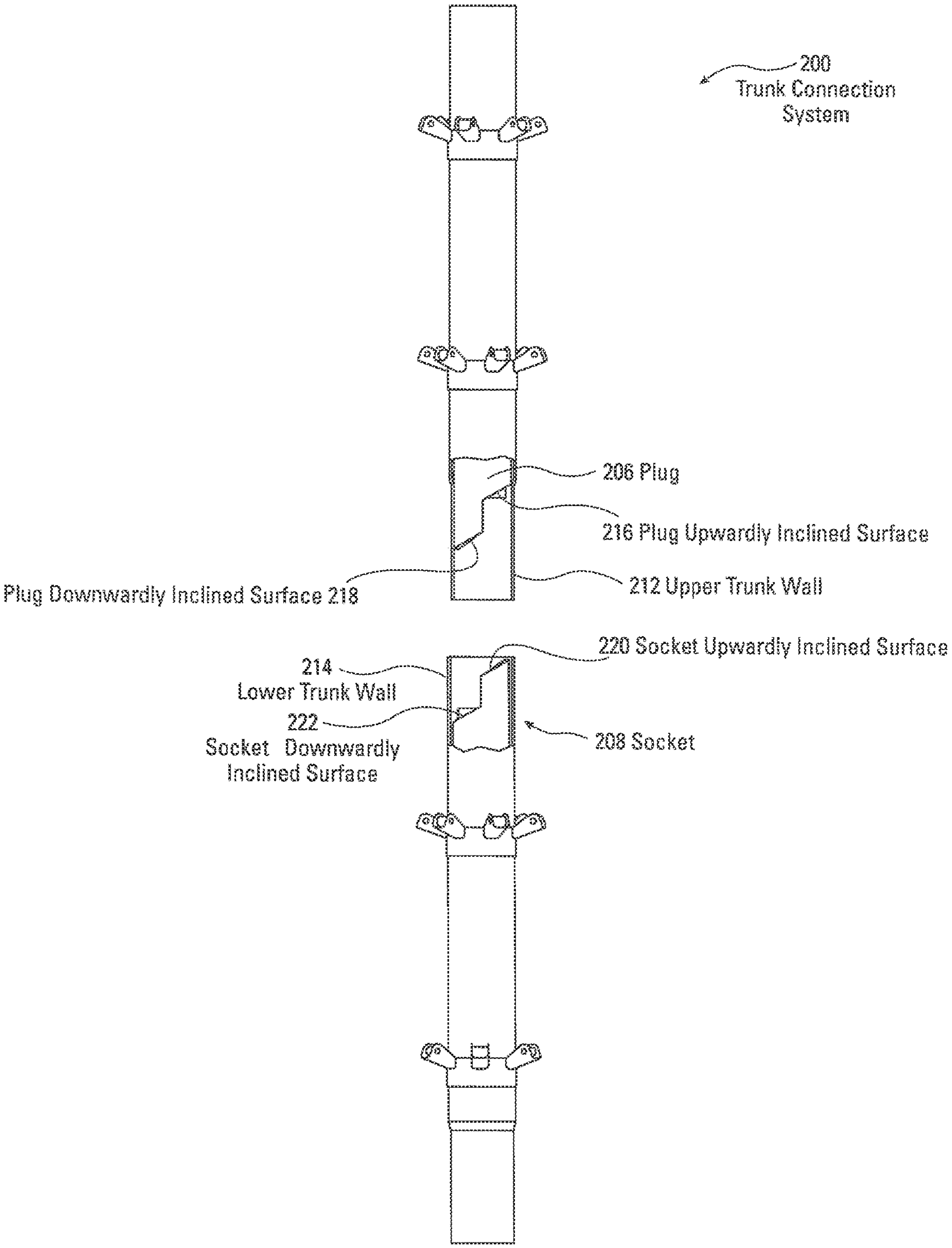
FIG. 13 is another side view of the trunk connection system of FIG. 9.

FIG. 13 is another side view of the trunk connection system 200. As illustrated in FIG. 13, plug 206 has a plug upwardly inclined surface 216 and plug downwardly inclined surface 218, Similarly, socket 208 has a socket upwardly inclined surface 220 and a socket downwardly inclined surface 222. The inclined surfaces of the plug 206 match the inclined surfaces of the socket 208 so that the plug in the socket can be engaged and mate with one another.

Figure 14:
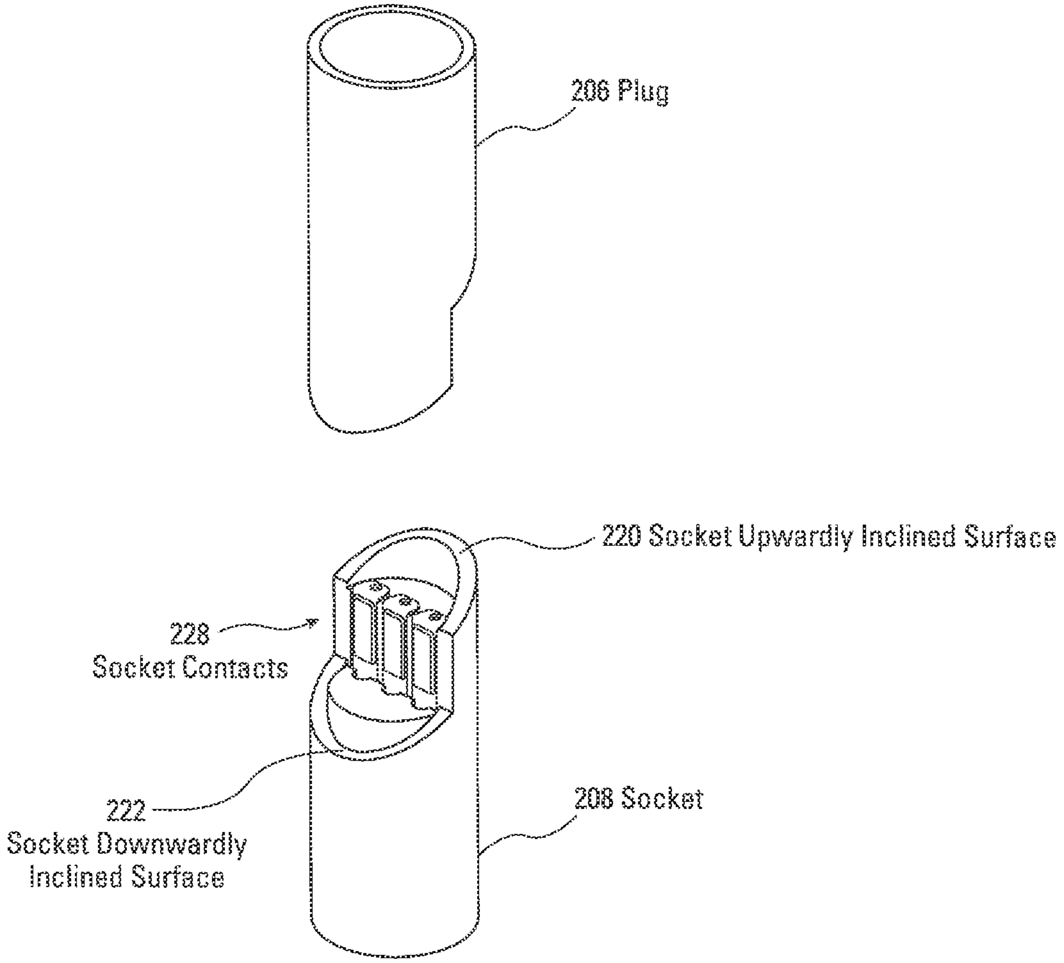
FIG. 14 is another perspective assembly view of the plug and socket of the embodiment of FIG. 9.

FIG. 14 is an exploded assembly view of plug 206 and socket 208, As illustrated in FIG. 14, socket contacts 228 are placed in one half of the open area of the socket 208 so that they engage the plug contacts of plug 206. The socket upwardly inclined surface 220 and the socket downwardly inclined surface 222 engage the inclined surfaces of the plug 206 and create solid contact between the plug contacts and socket contacts 228. Both the plug contacts and the socket contacts 228 protrude slightly from the center line of the plug 206 and socket 208, respectively, and thereby create a solid electrical connection as a result of the forces created between the plug 206 and the socket 208 when the trunk sections are assembled. The plug contacts 210 (FIG. 11) and socket contacts 228 (FIG. 14) can be made to deflect slightly to create the generally radial forces that produce a solid and reliable electrical connection between the plug contacts 210 and socket contacts 228, Alternatively, or in addition to the ability of the plug contacts 210 and socket contacts 228 to deflect, the walls of the plug 206 and socket 208 may flex slightly and have elasticity to create the generally radial forces.

Figure 15:
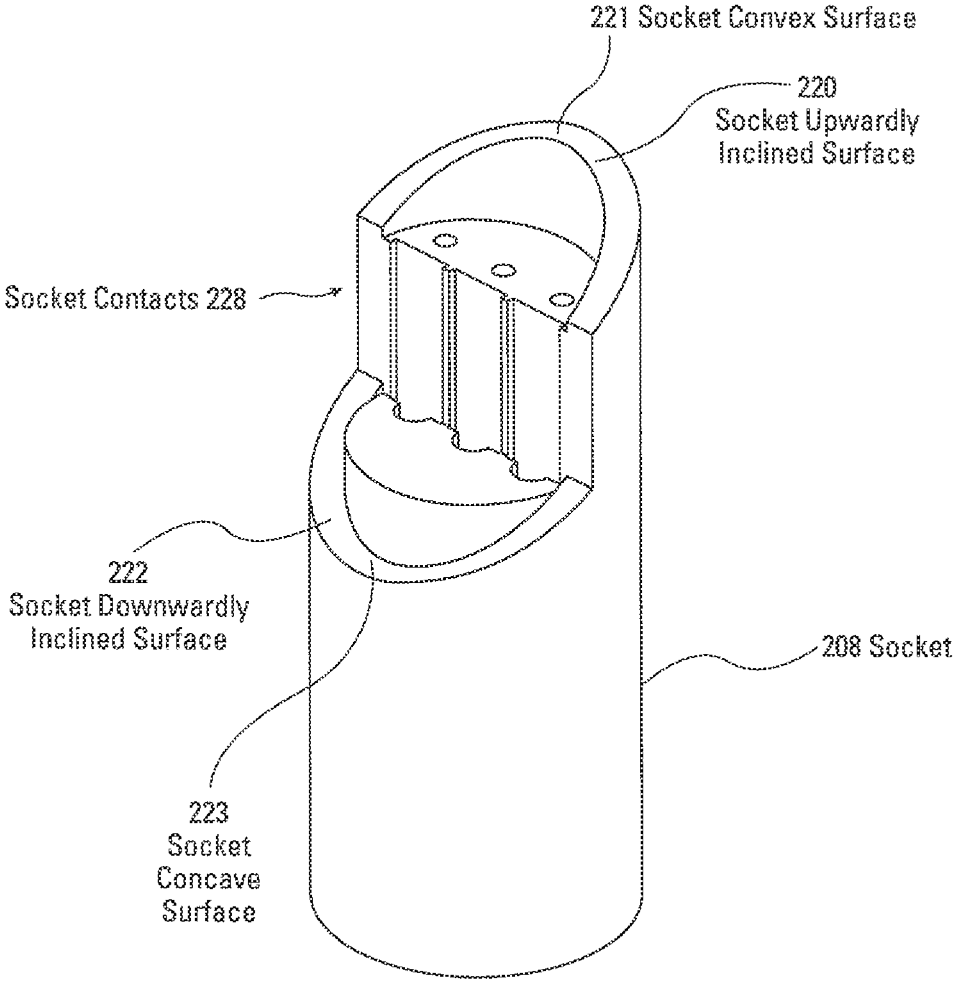
FIG. 15 is a close-up view of the socket of the embodiment of FIG. 9.

FIG. 15 is a close-up view of socket 208. As illustrated in FIG. 15, socket contacts 228 are disposed in one half of the open portion of the socket 208. An extended portion of socket 208 includes a socket upwardly inclined surface 220. A socket downwardly inclined surface 222 runs downwardly from the socket contacts 228. These sloped surfaces engage similar sloped surfaces on the plug. The sloped surfaces allow the plug to slidingly engage the plug 206 so that plug contacts engage socket contacts 228. The socket convex surface 221 engages a concave surface on the plug 206 while socket concave surface 223 engages a convex surface on the plug 206. Once the convex and concave surfaces are engaged, the convex and concave surfaces assist in maintaining the position of the socket 208 with the position of the plug 206 so that the convex and concave surfaces absorb radial forces that are pushing the socket 208 away from the plug 206.

Figure 16:
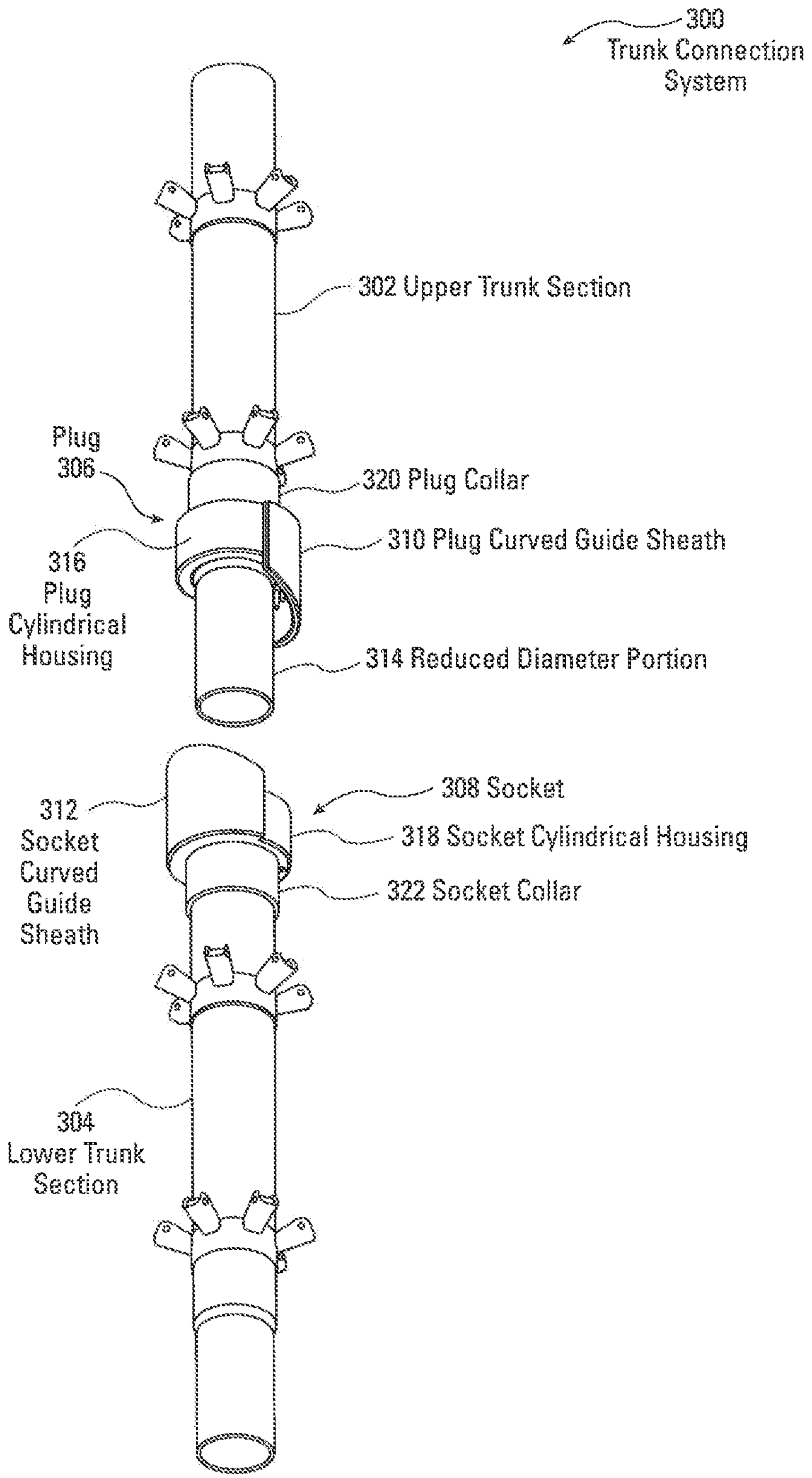
FIG. 16 is a perspective view of another embodiment of a trunk connection system.

FIG. 16 illustrates another embodiment of a tree connection system 300. As shown in FIG. 16, the trunk connection system 300 has an upper trunk section 302 and a lower trunk section 304. Again, as many trunk sections as desired can be assembled in accordance with the trunk connection system 300 illustrated in FIG. 16. Upper trunk section 302 includes an attached plug 306 that is connected to the upper trunk section 302 by any desired means known by those skilled in the art, such as mentioned above, Plug 306 includes a plug collar 320 that aligns and secures the plug 306 to the upper trunk section 302. Plug 306 also includes a plug cylindrical housing 316 and a plug curved guide sheath 310 that is attached to a portion of the outside surface of the plug cylindrical housing 316. The plug curved guide sheath 310 guides the plug with respect to the socket 308. Upper trunk section 302 includes a reduced diameter portion 314 that is inserted into the end of lower trunk section 304, which has a non-reduced diameter portion.

Socket 308, illustrated in FIG. 16, has a socket collar 322 that surrounds the lower trunk section 304 and guides and supports the socket 308 on the lower trunk section 304. Socket 308 also includes a socket cylindrical housing 318 and socket curved guide sheath 312 connected to the outer cylindrical surface of the socket cylindrical housing 318. Socket curved guide surface 312 engages the plug cylindrical housing 316 while the plug curved guide sheath 310 engages the socket cylindrical housing 318 when the reduced diameter portion 314 is inserted into the lower trunk section 304. The curved guide sheaths 310, 312 function to rotationally align the plug 306 and the socket 308.

Figure 17:
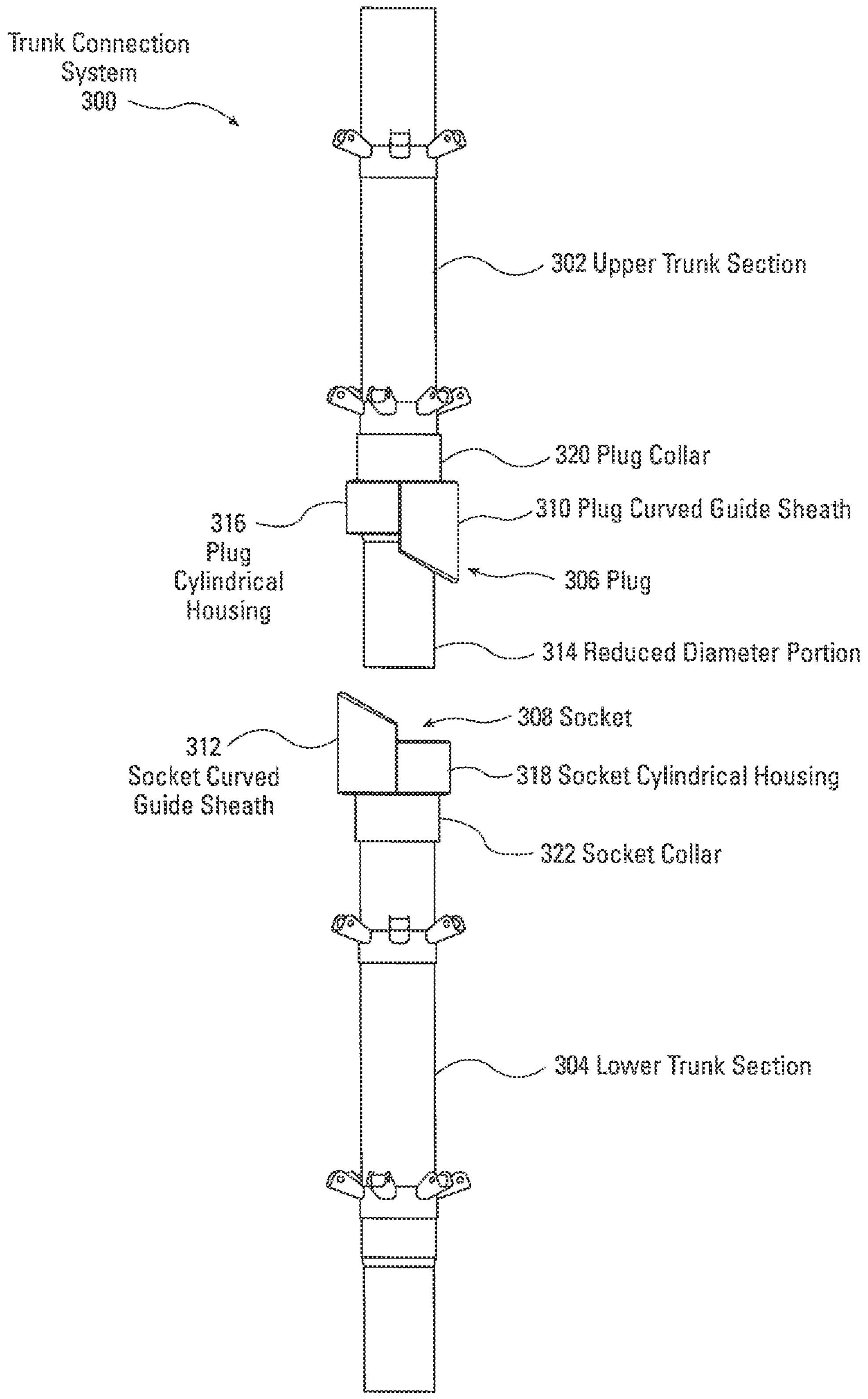
FIG. 17 is a side view of the embodiment of FIG. 16.

FIG. 17 is a side view of the embodiment on the trunk connection system 300 illustrated in FIG. 16. As shown in FIG. 17, the plug curved guide sheath 310 surround approximately half of the outside cylindrical surface of the plug cylindrical housing 316, Plug collar 320 secures the plug 306 to the upper trunk section 302. The plug curved guide sheath 310 is aligned with the open portion of the socket cylindrical housing 318. Socket curved guide sheath 312 is connected to approximately half of the socket cylindrical housing 318. Socket curved guide sheath 312 aligns with the open portion of the plug cylindrical housing 316, Socket collar 322 aligns the socket 308 and secures the socket 308 to the lower trunk section 304.

Figure 18:
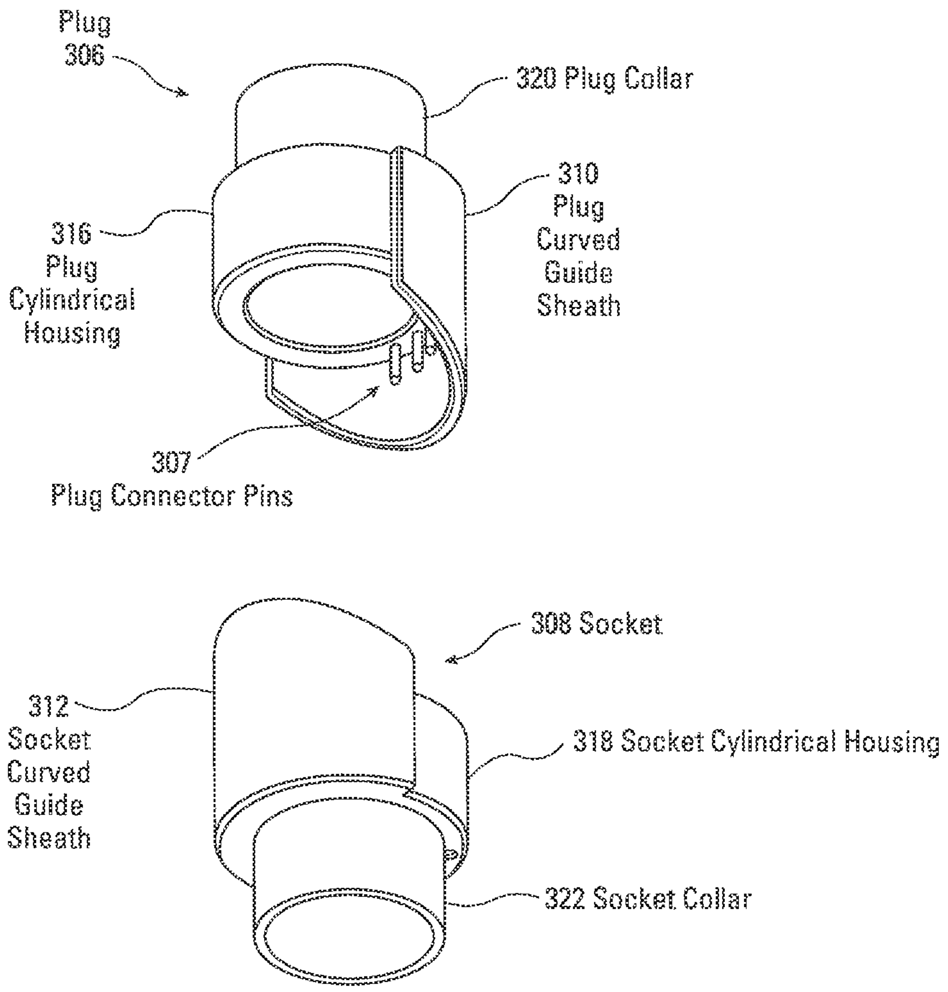
FIG. 18 is a perspective assembly view of a plug and socket of the embodiment of FIG. 16.

FIG. 18 is a close-up assembly view of the plug 306 and socket 308. As illustrated in FIG. 18, the plug curved guide sheath 310 is connected to and occupies slightly less than half of the outer surface of the plug cylindrical housing 316. Plug cylindrical housing 316 has connector pins 307 extending downwardly from the surface of the plug cylindrical housing 316. Socket 308 has a socket curved guide sheath 312 that is attached to just slightly less than half of the curved surface of the socket cylindrical housing 318. Socket collar 322 extends downwardly from the socket cylindrical housing 318.

Figure 19:
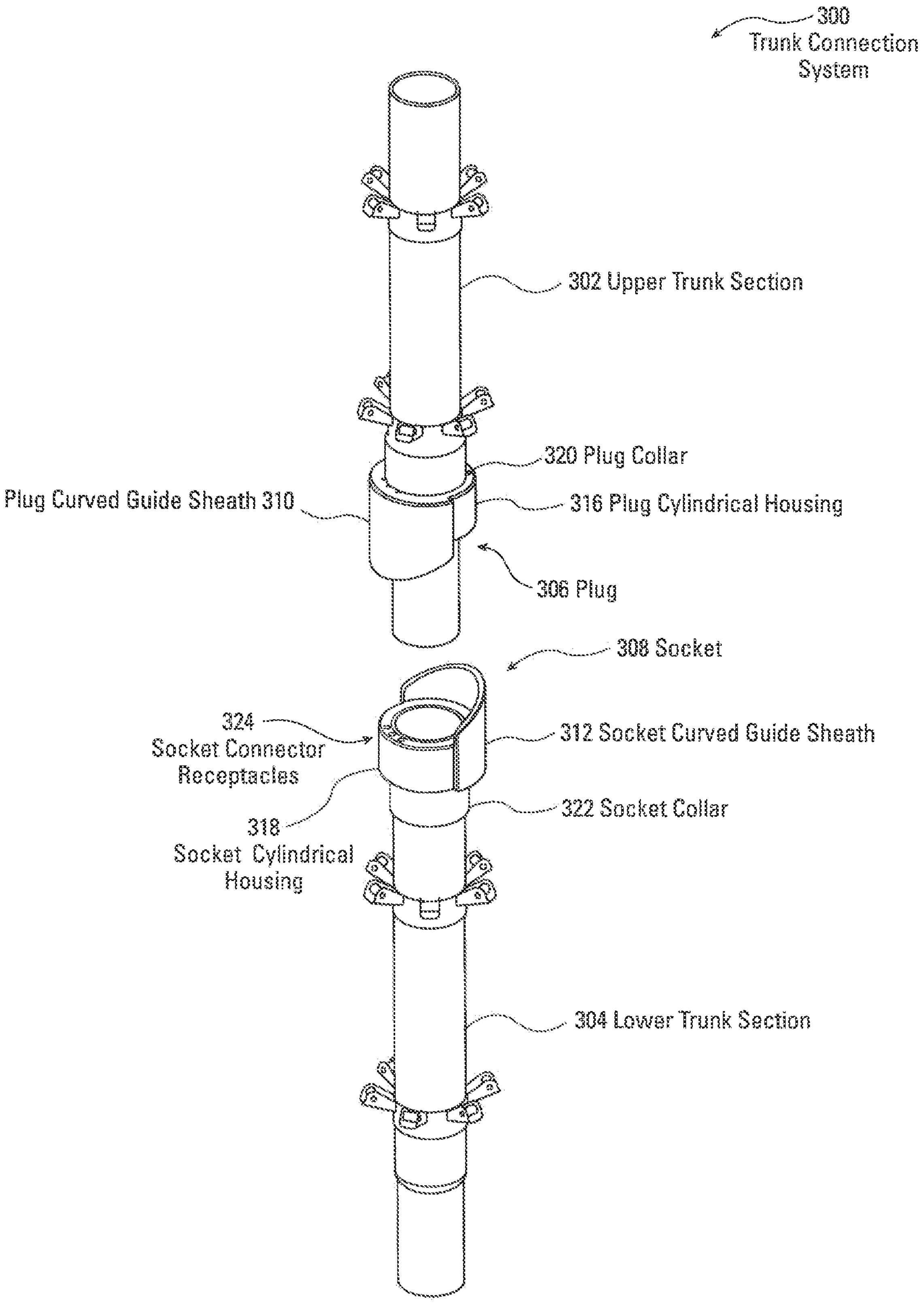
FIG. 19 is another perspective view from a different perspective of the embodiment of FIG. 16.

FIG. 19 is a perspective view of the trunk connection system 300 viewed from a different perspective than FIG. 16. As illustrated in FIG. 19, the plug curved guide sheath 310 surrounds approximately half of the plug cylindrical housing 316. Plug collar 320 connects the plug 306 to the upper trunk section 302. Socket 308 has a socket curved guide sheath 312 that surrounds approximately half of the socket cylindrical housing 318. Socket cylindrical housing 318 has socket connector receptacles 324 which receive the plug connector pins 307 illustrated in FIG. 18. Plug connector pins 307 and the socket connector receptacles 324 provide an electrical connection between the plug 306 and the socket 308. Socket collar 322 connects the socket 308 to the lower trunk section 304.

Figure 20:
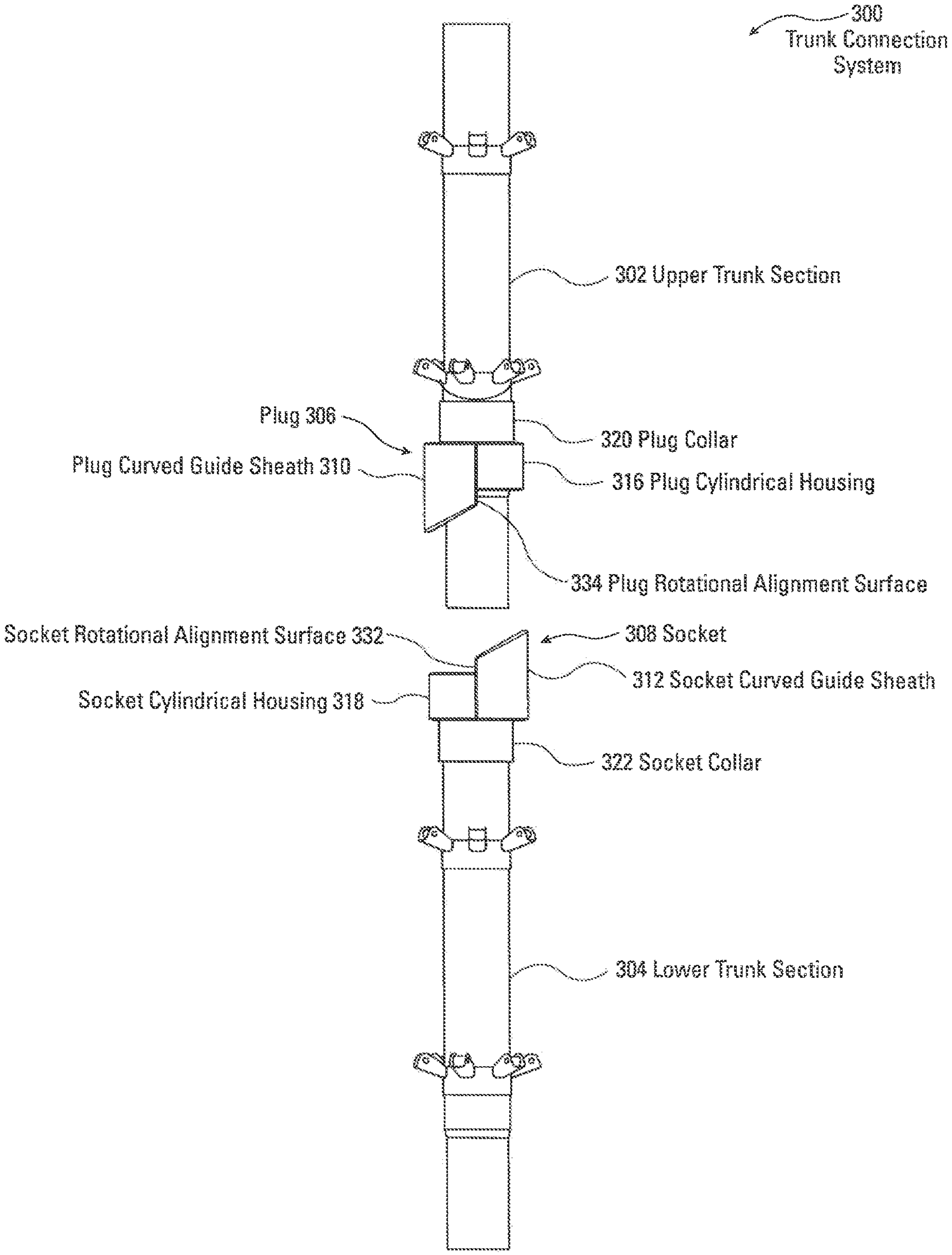
FIG. 20 is another side view of the embodiment of FIG. 16.

FIG. 20 is another side view of the trunk connection system 300. The plug cylindrical housing 316 is partially covered by the plug curved guide sheath 310. The vertical portions of the plug curved guide sheath 310 comprise plug rotational alignment surfaces such as plug rotational alignment surface 334. The plug curved guide sheath 310, as shown in FIG. 20, occupies approximately half of the surface of the socket cylindrical housing 318. The socket rotational alignment surface 332 abuts against the plug rotational alignment surface 334 to provide rotational alignment between the plug 306 and the socket 308. Socket collar 322 connects the socket 308 to the lower trunk section 304. Plug collar 320 connects the plug 306 to the upper trunk section 302. Of course, the plug curved guide sheath 310 can occupy any desired amount of the surface of the socket cylindrical housing 318.

Figure 21:
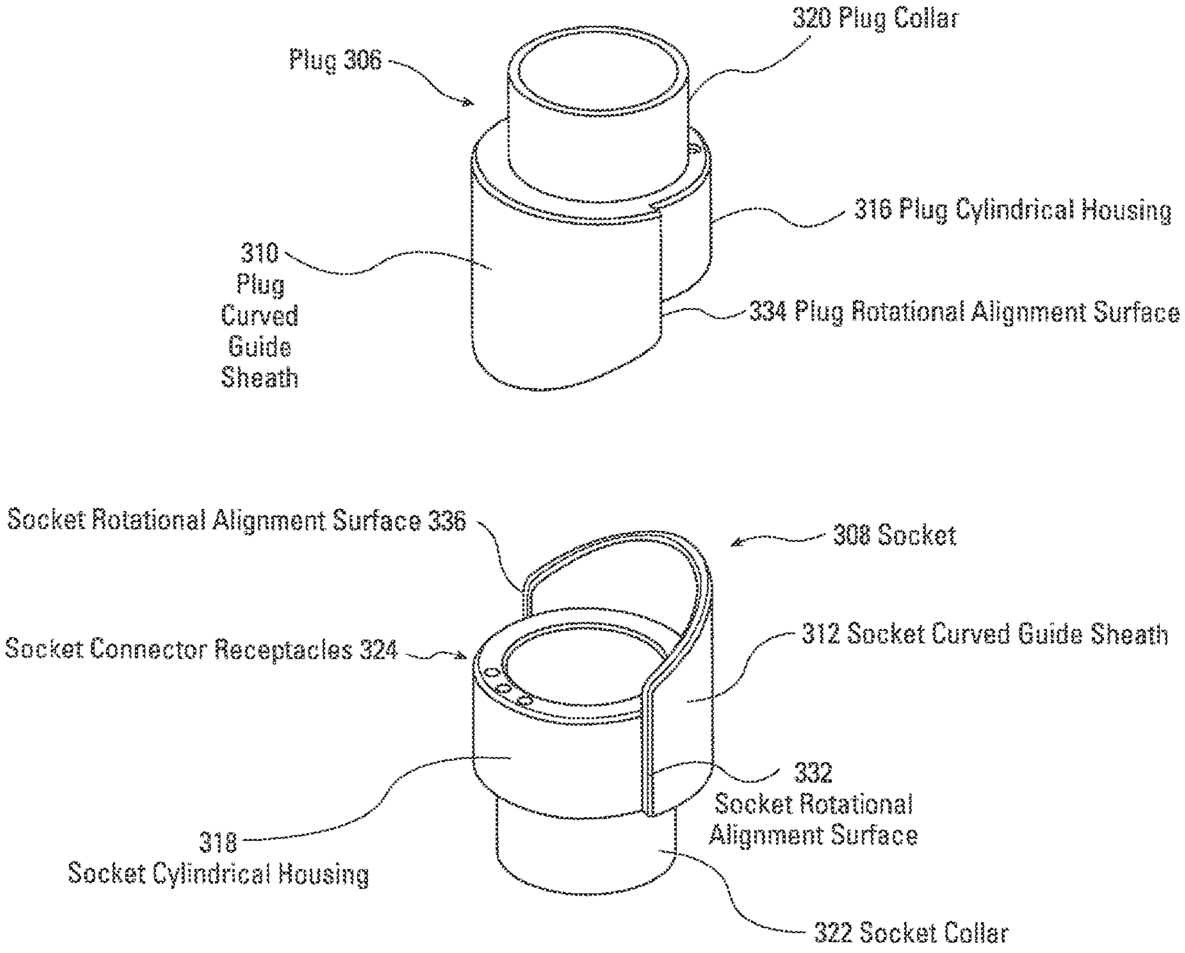
FIG. 21 is a perspective assembly view of a plug and socket of the embodiment of FIG. 16.

FIG. 21 is a close-up perspective assembly view of the plug 306 and the socket 308. Plug 306 includes the plug collar 320 and a plug curved guide sheath 310 that is coupled to the plug cylindrical housing 316. Plug curved guide sheath 310 has a plug rotational alignment surface 334, Socket 308 has a socket collar 322 and a socket curved guide sheath 312 that surrounds a portion of the socket cylindrical housing 318. Socket connector receptacles 324 receive the plug connector pins 307 to form an electrical connection. The socket curved guide sheath 312 includes a socket rotational alignment surface 336 and a socket rotational alignment surface 332 that abut against similar surfaces on the plug 306, such as plug rotational alignment surface 334.

Figure 22:
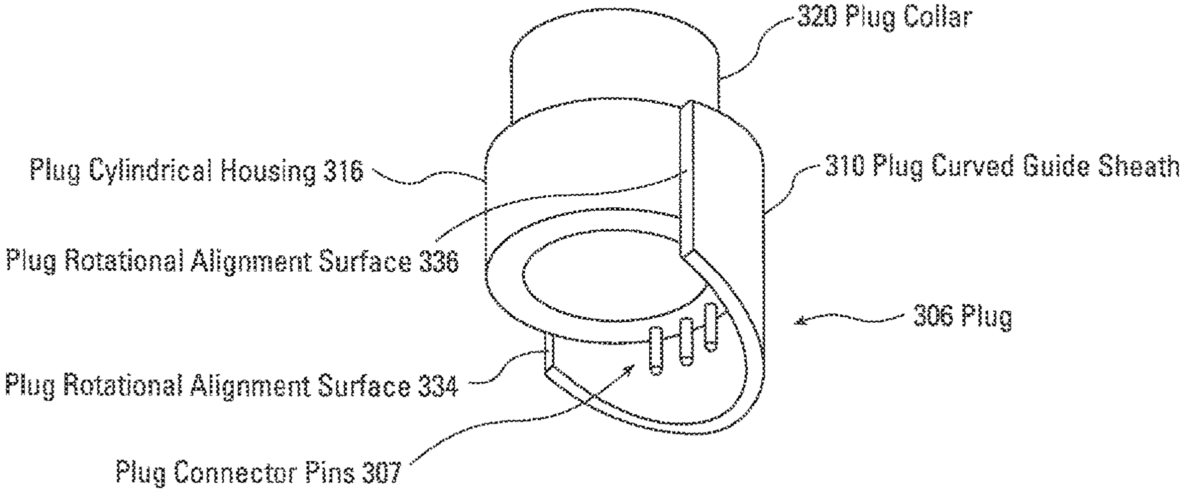
FIG. 22 is a perspective view of the plug of the embodiment of FIG. 16.

FIG. 22 is a close-up perspective view of plug 306, As illustrated in FIG. 22, plug 306 includes a plug collar 320, a plug cylindrical housing 316 and a plug curved guide Sheath 310 that surrounds approximately half of the plug cylindrical housing 316, as shown in FIG. 22. The plug curved guide sheath 310 has plug rotational alignment surface 334 and plug rotational alignment surface 336. Also shown in FIG. 22 are the plug connector pins 307. The plug curved guide sheath 310 and the socket curved guide sheath 312 can surround any desired amount of the surface of the plug cylindrical housing 316 or the socket cylindrical housing 318 as long as the socket curved guide sheath 312 has socket rotational alignment surfaces 332, 333 that abut the plug rotational alignment surfaces 334, 336.

Figure 23:
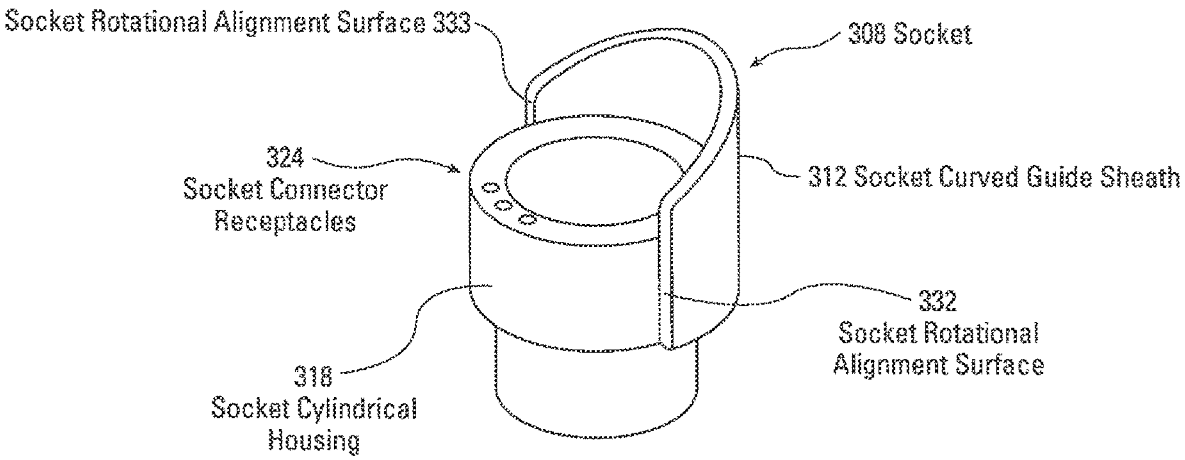
FIG. 23 is a perspective view of the socket of the embodiment of FIG. 16.

FIG. 23 is a close-up perspective view of the socket 308. As illustrated in FIG. 23, the socket curved guide sheath 312 is connected to the socket cylindrical housing 318 and provides socket rotational alignment surfaces 332, 333, Again, the socket curved guide sheath 312 can occupy any desired amount of the surface of the socket cylindrical housing 318 as long as the corresponding plug curved guide sheath 310 occupies the other open area so that the socket rotational alignment surfaces 332, 333 abut against the plug rotational alignment surfaces 334, 336, respectively, Socket connector receptacles 324 engage the plug connector pins 307 to provide an electrical connection between the plug 306 and socket 308.

Figure 24:
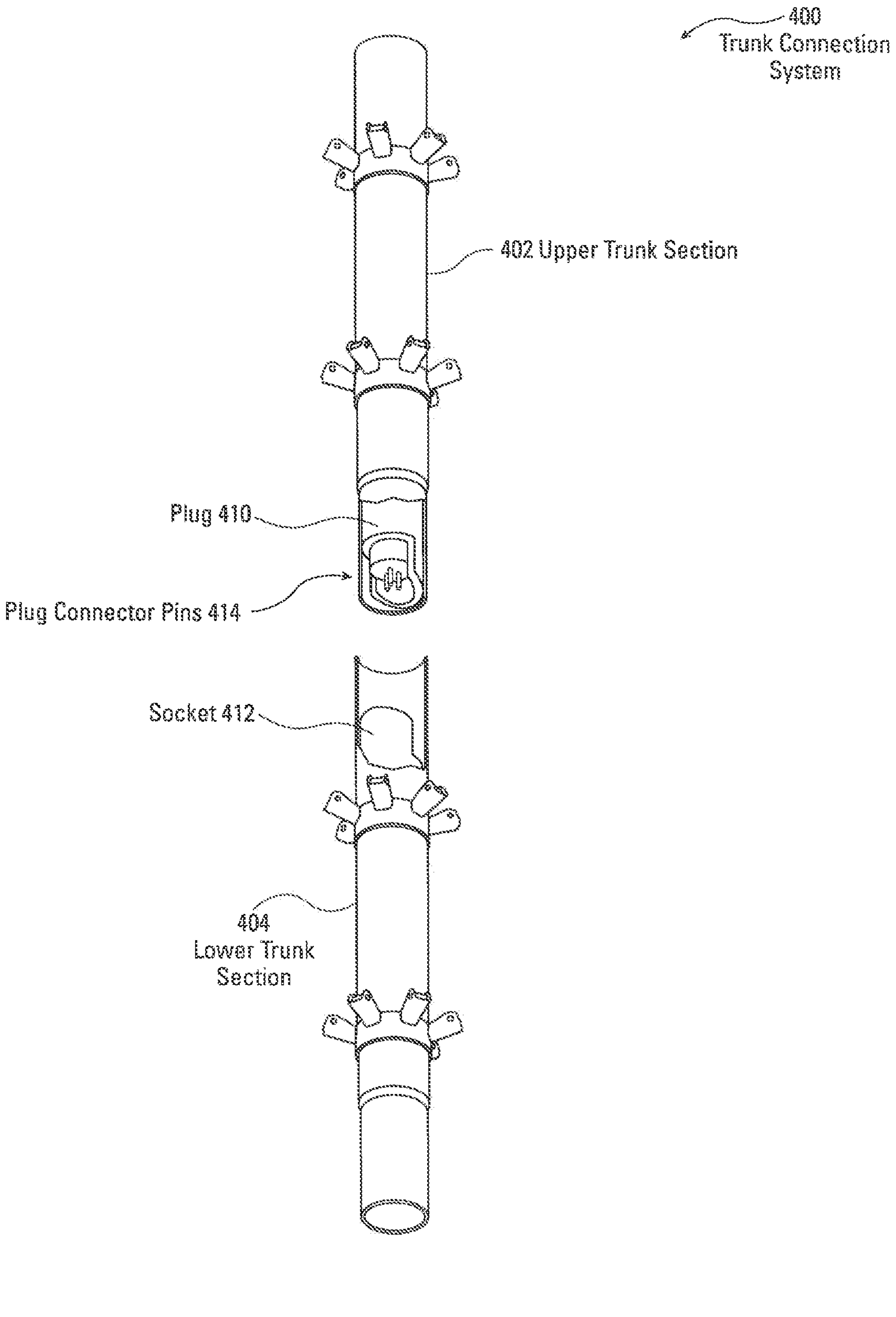
FIG. 24 is a perspective view of another embodiment of a trunk connection system.

FIG. 24 illustrates another embodiment of a trunk connection system 400. As illustrated in FIG. 24, the trunk connection system 400 includes an upper trunk section 402 and a lower trunk section 404. The upper trunk section 402 has a plug 410 mounted on the hollow interior surface of the upper trunk section 402. Plug 410 includes plug connector pins 414. Lower trunk section 404 includes a socket 412 that is mounted on an interior portion of the lower trunk section 404, as shown in the cut-away section illustrated in FIG. 24.

Figure 25:
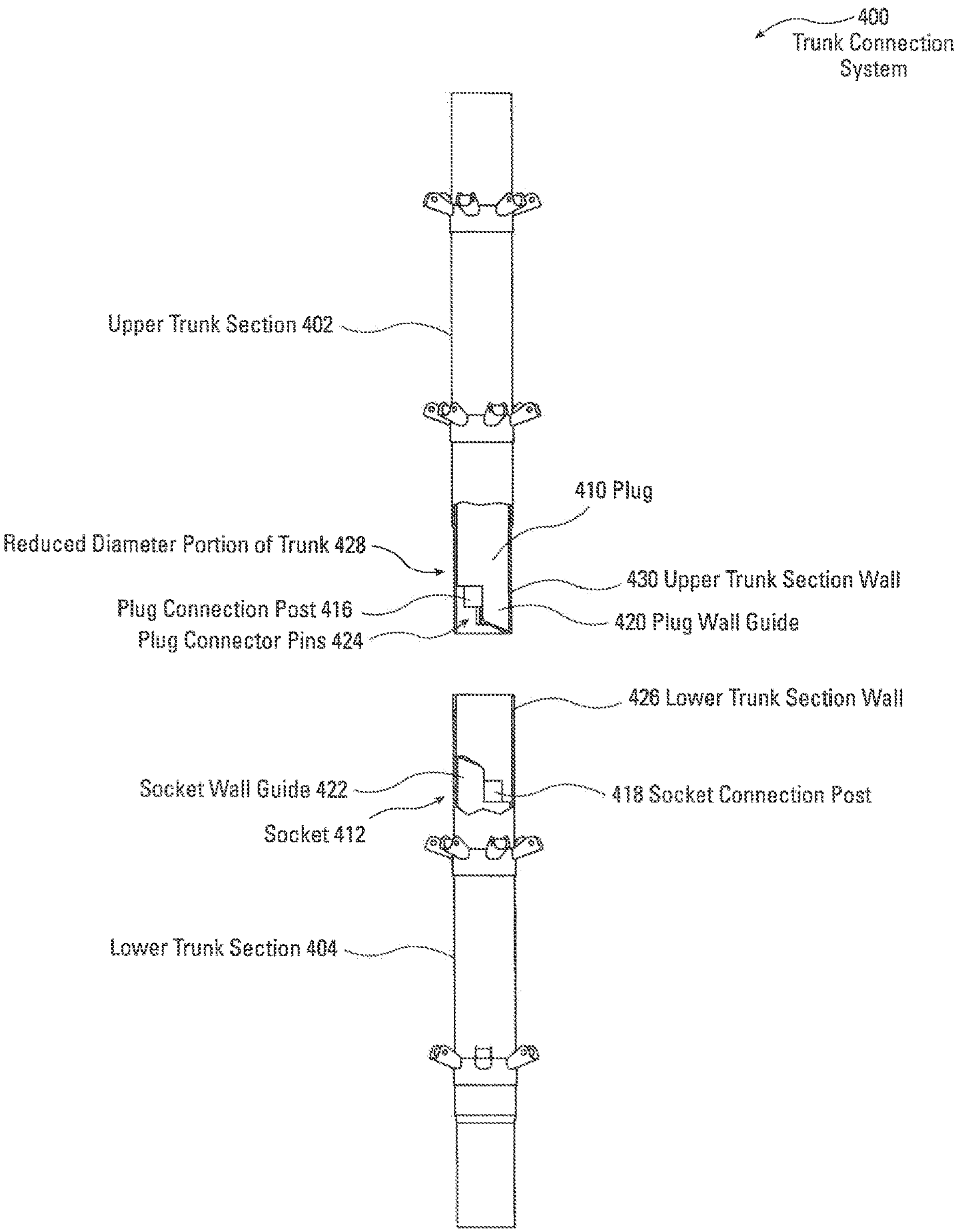
FIG. 25 is a side view of the embodiment of FIG. 24.

FIG. 25 is a side view of the trunk connection system 400. As illustrated in FIG. 25, upper trunk section 402 includes a reduced diameter portion 428 of the upper trunk section 402. Plug 410 is mounted on the upper trunk section wall 430 by any desired means such as disclosed above, Plug 410 includes a plug connection post 416, plug connector pins 424 and a plug wall guide 420. Socket 412 includes a socket wall guide 422, a socket connection post 418 and is mounted in the lower trunk section wall 426, as illustrated in the cut-away version illustrated in FIG. 25.

Figure 26:
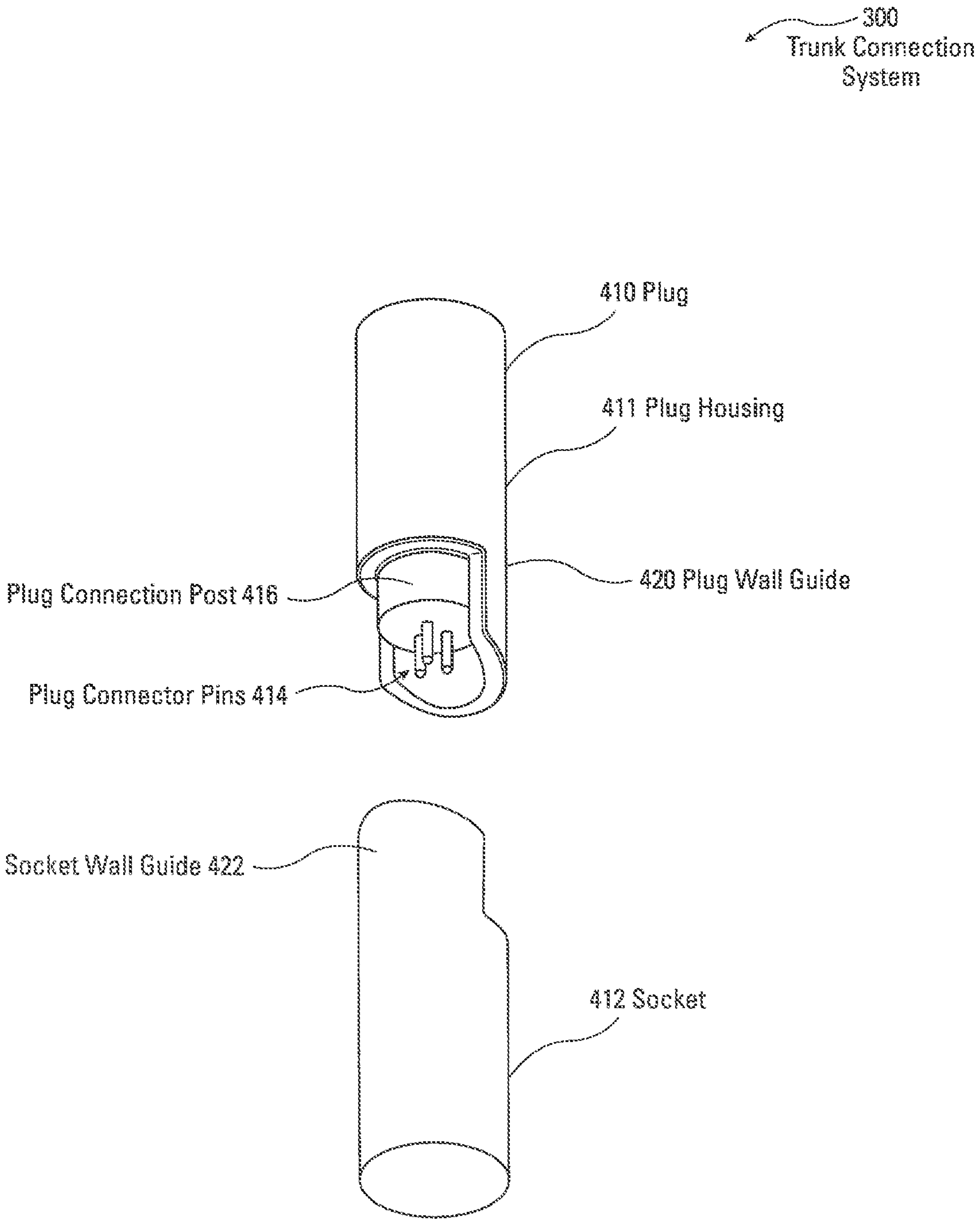
FIG. 26 is a perspective assembly view of a plug and socket of the embodiment of FIG. 24.

FIG. 26 is a perspective assembly view of plug 410 and socket 412. As illustrated in FIG. 26, the plug connection post 416 has a plurality of plug connector pins 414. Plug 410 has a plug wall guide 420, which engages the socket wall guide 422 to provide rotational alignment between plug 410 and socket 412.

Figure 27:
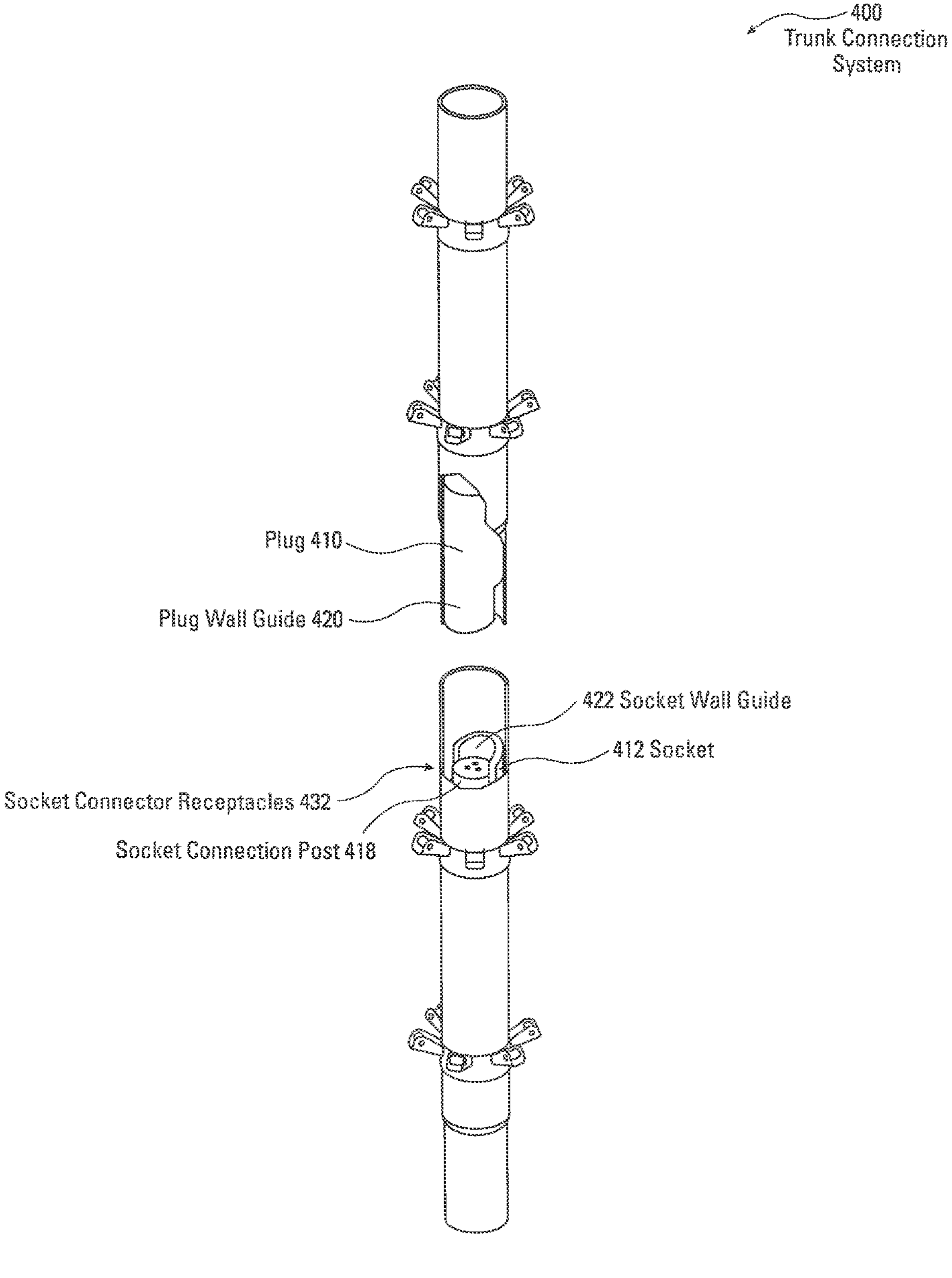
FIG. 27 is another perspective view of the embodiment of FIG. 24.

FIG. 27 is a perspective view of the trunk connection system 400 from a different perspective. As shown in the cut-away portions of FIG. 27, plug 410 has a plug wall guide 420. Socket 412 has a socket wall guide 422 that engages the plug wall guide 420 to rotationally align the plug 410 and the socket 412. Socket connection post 418 includes socket connector receptacles 432 that receive the plug connector pins 414 illustrated in FIG. 26.

Figure 28:
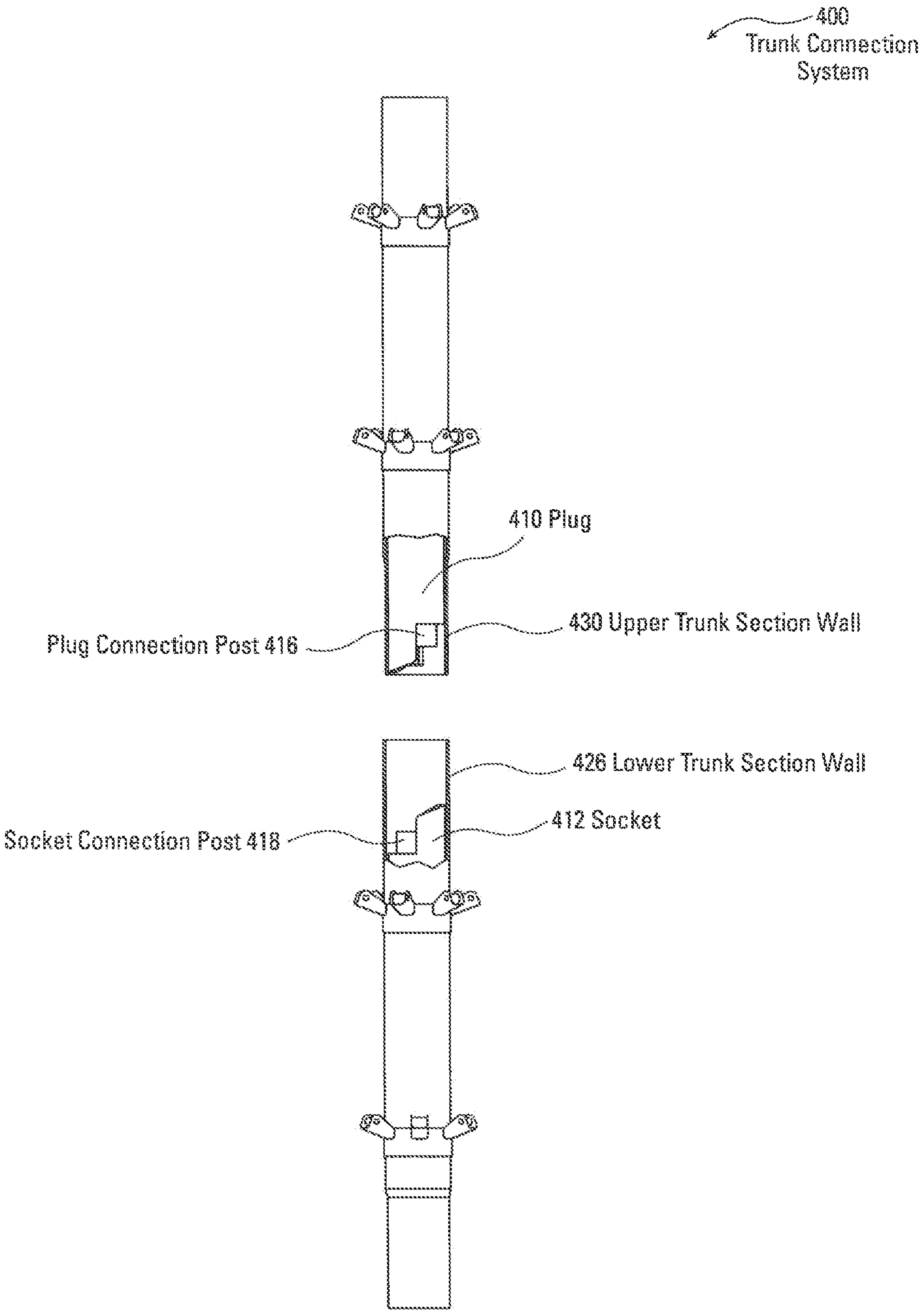
FIG. 28 is another side view of the embodiment of FIG. 24.

FIG. 28 is a side view of the trunk connection system 400. As shown in the cut-away portions of FIG. 28, plug 410 includes a plug connection post 416. Plug 410 is mounted in the upper trunk section wall 430. Socket 412 includes a socket connection post 418. Socket 412 is connected to the lower trunk wall 426.

Figure 29:
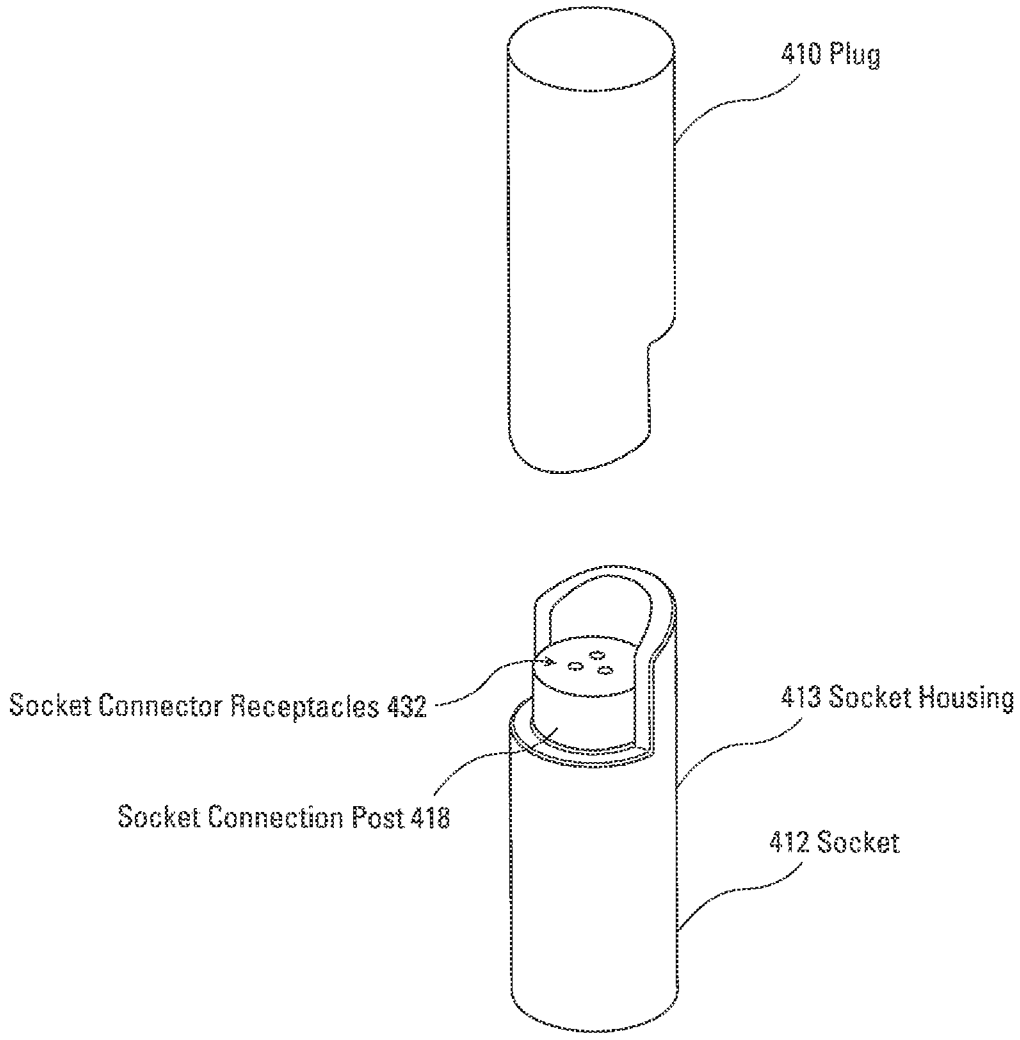
FIG. 29 is perspective assembly view of a plug and socket of the embodiment of FIG. 24.

FIG. 29 is a perspective assembly view of the plug 410 and the socket 412, As illustrated in FIG. 29, socket 412 has a socket connection post 418. Socket connector receptacles 432 are mounted in the socket connection post 418 and receive the plug connector pins 414, illustrated FIG. 24, to make an electrical connection between the plug 410 and socket 412.

Figure 30:
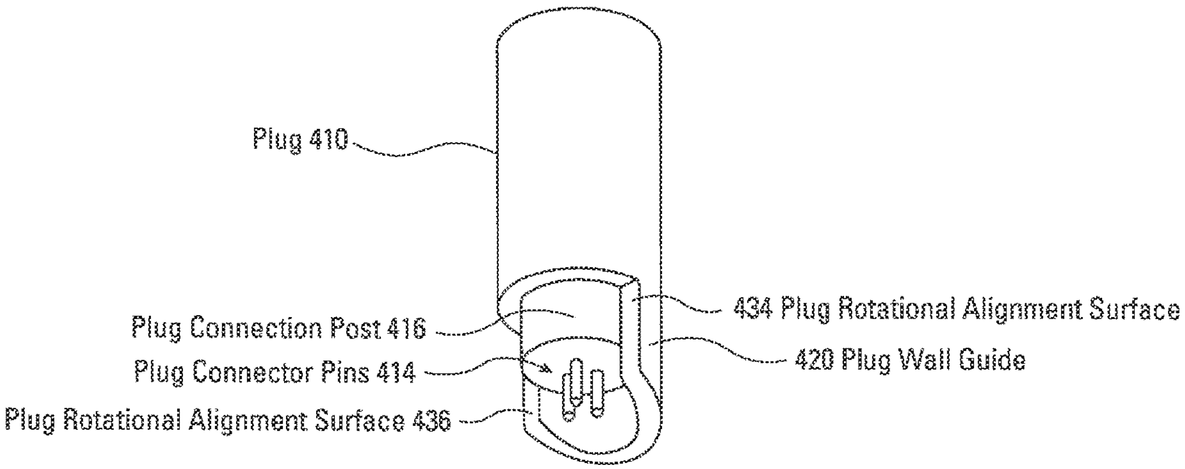
FIG. 30 is a perspective view of the plug of the embodiment of FIG. 24.

FIG. 30 is a close-up perspective view of the plug 410. As shown in FIG. 30, plug 410 includes a plug connection post 416, which holds the plug connector pins 414. The plug wall guide 420 has a plug rotational alignment surface 436 and a plug rotational alignment surface 434 that rotationally align the plug 410 with the socket 412.

Figure 31:
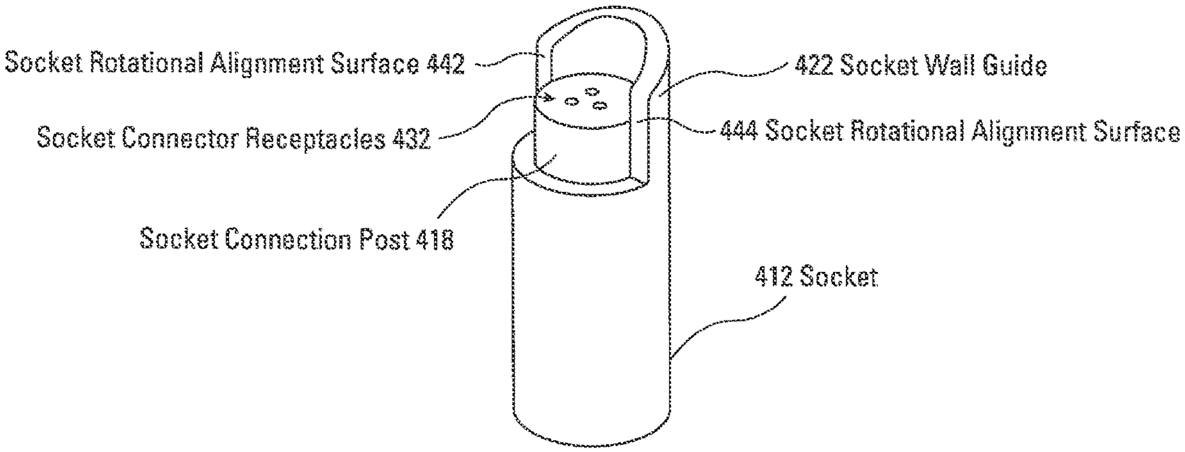
FIG. 31 is a perspective view of the socket of the embodiment of FIG. 24.

FIG. 31 is a close-up perspective view of the socket 412, As illustrated in FIG. 31, socket 412 has socket rotational alignment surface 442 and socket rotational alignment surface 444. These alignment surfaces are a portion of the socket wall guide 422. Socket connection post 418 includes socket connector receptacles 432 that engage the plug connector pins 414, illustrated in FIG. 30. In this manner, an electrical connection is made between the plug 410 and socket 412.

Figure 32:
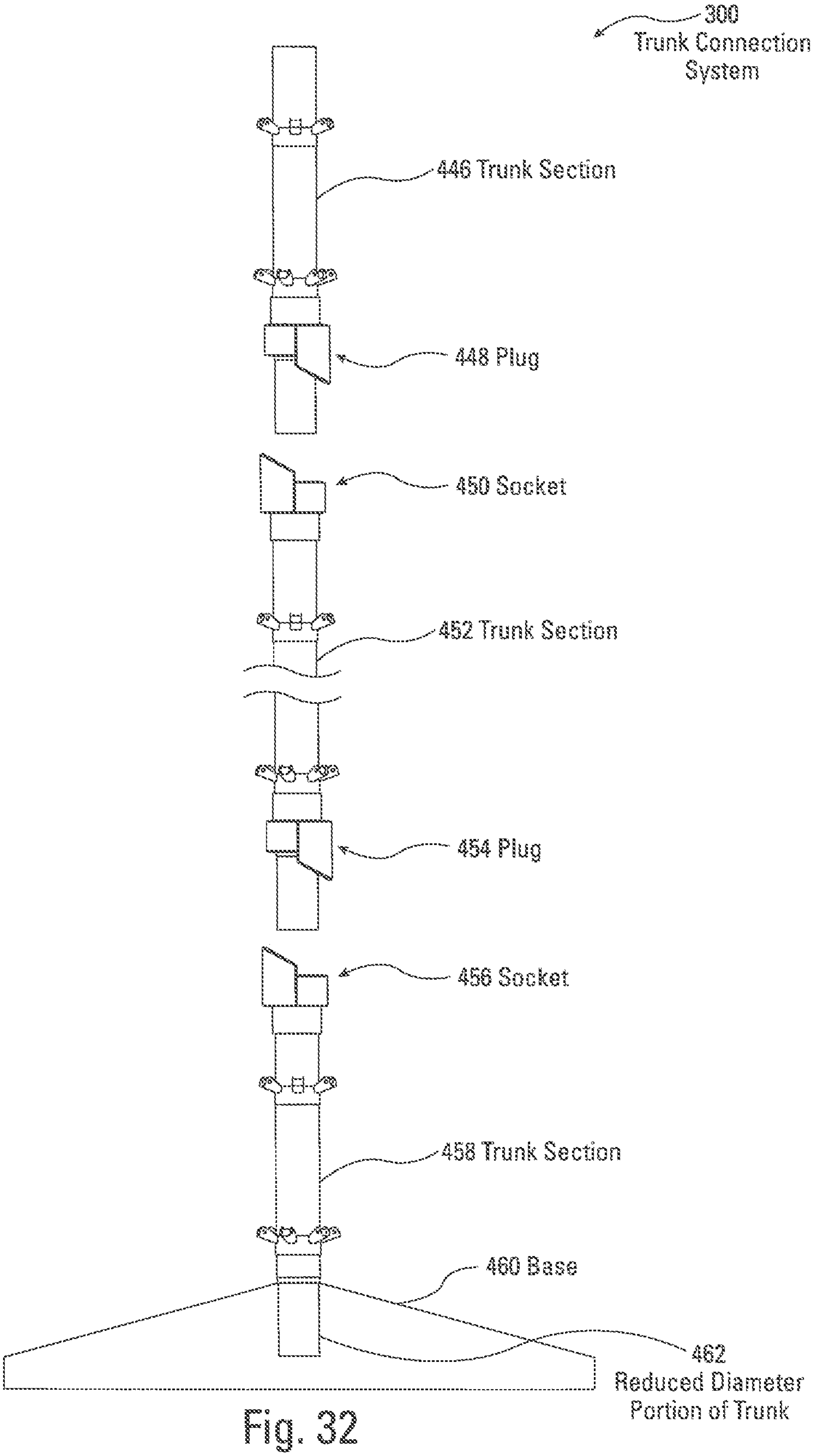
FIG. 32 is a side view of an assembled tree trunk and base of the embodiment of FIG. 16.

FIG. 32 is a side view of the trunk connection system 300 with multiple trunk sections. As illustrated in FIG. 32, trunk section 446 has a plug 448 that engages socket 450, Trunk section 452 has a plug 454 that engages socket 456 of trunk section 458. The reduced diameter portion 462 of trunk section 458 fits in the base 460. Power can be supplied from the base as well as control signals to operate lights on each of the trunk sections. The control signals and power are transmitted through the plugs and sockets illustrated in FIG. 32.

Accordingly, the present invention provides unique embodiments for supplying power and control signals through trunk sections of an artificial tree. Embodiments illustrated herein provide solid and secure electrical contact between plugs and receptacles so that electrical signals, including both power and control signals, can be reliably transmitted through the trunk sections to control lights connected to each of the trunk sections. Some embodiments utilize sloped surfaces to create forces and convex and concave sections of the plugs and socket to both create forces on the connectors and to hold the plugs and sockets in place. In this manner, reliable electrical connections can be made. Other embodiments use pins and connector sockets with rotational alignment surfaces that ensure that proper rotational alignment is created between the plugs and the sockets.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for connecting electrical signals between a plurality of trunk sections of an artificial tree comprising:

a first trunk section of said plurality of trunk sections of said artificial tree having a first trunk section axis;

a second trunk section of said plurality of trunk sections of said artificial tree, having a second trunk section axis, that connects to said first trunk section so that said first trunk section axis aligns with said second trunk section axis to form a tree trunk axis;

a plug mounted on an exterior portion of said first trunk section having a plug interior wall portion and plug inclined surfaces that are inclined in a plug inclined plane;

a socket mounted on an exterior portion of said second trunk section, said socket having a socket exterior wall portion, and socket inclined surfaces that are inclined in a socket inclined plane that is parallel to said plug inclined plane when said socket and plug are assembled so that said plug and said socket are rotationally aligned around said tree trunk axis, and said plug and said socket are axially aligned along said tree trunk axis when said first trunk section connects to said second trunk section as a result of said plug inclined plane interfacing with said socket inclined plane;

plug contacts mounted on an interior portion of said plug on said plug interior wall portion, said plug contacts mounted parallel to said tree trunk axis, and having a flat plug contact surface that is transverse to said plug inclined plane so that incline forces created between said plug inclined surfaces and said socket inclined surfaces are transverse to said flat plug contact surface;

socket contacts mounted on an interior portion of said socket on said socket exterior wall portion parallel to said tree trunk axis, said socket contacts having a flat socket contact surface, that is transverse to said socket inclined plane, so that incline forces created when said socket inclined surfaces engage said plug inclined surfaces, during assembly of said plug and said socket, are traverse to said flat socket contact surface, said flat socket contact surface being aligned with and engaging said flat plug contact surface when said plug and said socket are assembled so that a contact force is created between said flat plug contact surface and said flat socket contact surface as a result of propinquity of said plug contacts and said socket contacts when said plug and said socket are assembled, and support provided to said plug contact by said plug interior wall portion and support provided to said socket contact by said socket exterior wall portion, and said incline forces created by said plug inclined surfaces and said socket inclined surfaces, upon engagement of said flat plug contact surface and said flat socket contact surface do not affect said contact force between said flat plug contact surface and said flat socket contact surface so that a solid electrical connection is created.

2. The system of claim 1 wherein said plug inclined plane comprises:

a plug upwardly inclined surface and a plug downwardly inclined surface; and, said socket inclined surfaces comprise a socket upwardly inclined surface and a socket downwardly inclined surface.

3. The system of claim 1 further comprising:

additional trunk sections;

additional plugs on said additional trunk sections;

additional sockets on said additional trunk sections.

4. The system of claim 1 further comprising:

a plug collar disposed on said plug that secures said plug to said first trunk section;

a socket collar disposed on said socket that secures said socket to said second trunk section.

5. The system of claim 1 further comprising:

a reduced diameter portion of said first trunk section or said second trunk section that engages and slides into a non-reduced diameter portion of said first trunk section or said second trunk section, respectively.

6. A method of connecting electrical signals between a plurality of trunk sections of a tree trunk for an artificial tree comprising:

providing a plug having plug inclined surfaces that are inclined on a plug inclined plane;

providing a socket having socket inclined surfaces that are inclined on a socket inclined plane and that mate with said plug inclined surfaces;

mounting said plug on and exterior portion of a first trunk section of said plurality of trunk sections of said tree trunk;

mounting said socket on an exterior portion of a second trunk section of said plurality of trunk sections of said tree trunk;

mounting a plug contact, having a flat plug contact surface, on an interior wall portion of said plug, parallel to an axis of said first trunk section, and transverse to said plug inclined planes;

mounting a socket contact, having a flat socket contact surface, on an exterior wall portion of said socket, parallel to an axis of said second trunk section, said socket contact placed in a position on said exterior wall portion of said socket that is opposite to said plug contact and transverse to said socket inclined planes so that a contact force is created between said plug contact and said socket contact;

assembling said first trunk section and said second trunk section by inserting a reduced diameter portion of said first trunk section into a non-reduced diameter portion of said second trunk section;

pushing said first trunk section and said second trunk section together which causes said plug inclined surfaces and said socket inclined surfaces to slide together to rotationally and axially align said plug and said socket along an axis of said first trunk section and said second trunk section when said first trunk section and said second trunk section are assembled, which creates an incline force between said plug incline surface and said socket incline surface, that is transverse to said contact force, between said flat plug contact and said flat socket contact as a result of propinquity of said plug contacts and said socket contacts, and establishes a solid electrical connections between said plug contacts and said socket contacts so that said contact force is not affected by said incline force.

7. The method of claim 6 wherein said method of providing a plug having plug incline surfaces comprises providing a plug having a plug upwardly inclined surface and a plug downwardly inclined surface, and wherein said method of providing a socket having socket inclined surfaces comprises providing a socket upwardly inclined surface and a socket downwardly inclined surface.

8. The method of claim 6 further comprising:

providing a collar on said plug that holds said plug securely to said first trunk section and assists in the generation of said transverse forces;

providing a collar on said socket that holds said plug securely to said second trunk section, which also assists in the generation of said transverse forces.

* * * * *